US012518062B2

(12) United States Patent
Bernat et al.

(10) Patent No.: US 12,518,062 B2
(45) Date of Patent: Jan. 6, 2026

(54) TECHNOLOGIES FOR ACCELERATED EDGE DATA ACCESS AND PHYSICAL DATA SECURITY FOR EDGE DEVICES

(71) Applicant: Intel Corporation, Santa Clara, CA (US)

(72) Inventors: Francesc Guim Bernat, Barcelona (ES); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 868 days.

(21) Appl. No.: 17/718,046

(22) Filed: Apr. 11, 2022

(65) Prior Publication Data

US 2022/0237127 A1 Jul. 28, 2022

Related U.S. Application Data

(63) Continuation of application No. 16/368,987, filed on Mar. 29, 2019, now Pat. No. 11,301,396.

(51) Int. Cl.
*G06F 21/71* (2013.01)
*G06F 21/62* (2013.01)
(Continued)

(52) U.S. Cl.
CPC .............. *G06F 21/71* (2013.01); *G06F 21/78* (2013.01); *G06F 21/6218* (2013.01); *G06F 21/86* (2013.01)

(58) Field of Classification Search
CPC ... H04L 63/10; H04L 63/107; H04L 63/1416; H04L 63/1408; G06F 21/86; G06F 21/70;
(Continued)

(56) References Cited

U.S. PATENT DOCUMENTS 7,774,645 B1 8/2010 Clark et al.
8,909,780 B1 12/2014 Dickinson et al.
(Continued)

OTHER PUBLICATIONS

United States Patent and Trademark Office, "Non-Final Office Action," in connection with U.S. Appl. No. 16/368,987, issued Mar. 3, 2021, 14 pages.

(Continued)

*Primary Examiner* — Tae K Kim
(74) *Attorney, Agent, or Firm* — Hanley, Flight & Zimmerman, LLC

(57) ABSTRACT

Technologies for accelerated edge data access and physical data security include an edge device that executes services associated with endpoint devices. An address decoder translates a virtual address generated by a service into an edge location using an edge translation table. If the edge location is not local, the edge device may localize the data and update the edge translation table. The edge device may migrate the service to another edge location, including migrating the edge translation table. The edge device may monitor telemetry and determine on a per-tenant basis whether a physical attack condition is present. If present, the edge device instructs a data resource to wipe an associated tenant data range. The determinations to localize remote data, to migrate the service, and/or whether the physical attack condition is present may be performed by an accelerator of the edge device. Other embodiments are described and claimed.

29 Claims, 10 Drawing Sheets

(51) Int. Cl.
*G06F 21/78* (2013.01)
*G06F 21/86* (2013.01)

(58) Field of Classification Search
CPC ........ G06F 21/71; G06F 21/75; G06F 21/755; G06F 21/77; G06F 11/3058; G06F 11/3055
See application file for complete search history.

(56) References Cited

U.S. PATENT DOCUMENTS

| | | | |
|---|---|---|---|
| 9,558,372 B2* | 1/2017 | Tucker | G06F 21/71 |
| 10,057,273 B1* | 8/2018 | Chakraborty | H04L 67/1044 |
| 10,127,409 B1* | 11/2018 | Wade | G06F 21/75 |
| 10,579,833 B1* | 3/2020 | Cook | G06F 21/86 |
| 10,645,123 B1 | 5/2020 | Vishwanathan et al. | |
| 10,747,679 B1 | 8/2020 | Larson et al. | |
| 11,301,396 B2 | 4/2022 | Bernat et al. | |
| 2003/0154348 A1 | 8/2003 | Keltcher et al. | |
| 2009/0195394 A1* | 8/2009 | Johnson | H04M 1/18 340/584 |
| 2011/0072234 A1 | 3/2011 | Chinya et al. | |
| 2012/0131673 A1* | 5/2012 | Caci | G06F 21/86 726/23 |
| 2012/0198242 A1* | 8/2012 | Dalzell | G06F 21/78 711/163 |
| 2012/0311269 A1 | 12/2012 | Loh et al. | |
| 2014/0007178 A1 | 1/2014 | Gillum et al. | |
| 2014/0223576 A1 | 8/2014 | Zhao | |
| 2015/0052525 A1 | 2/2015 | Raghu | |
| 2016/0034217 A1* | 2/2016 | Kim | G06F 3/0622 711/103 |
| 2016/0065386 A1 | 3/2016 | Hari | |
| 2016/0246717 A1 | 8/2016 | Patil et al. | |
| 2016/0246731 A1 | 8/2016 | Koob et al. | |
| 2016/0267298 A1* | 9/2016 | Tucker | G06F 21/71 |
| 2016/0306590 A1* | 10/2016 | Kang | G06F 3/0608 |
| 2018/0024938 A1 | 1/2018 | Paltashev et al. | |
| 2018/0096172 A1* | 4/2018 | Lu | G06F 21/79 |
| 2018/0129805 A1* | 5/2018 | Samuel | G06F 21/55 |
| 2018/0330129 A1* | 11/2018 | Falk | G06F 21/554 |
| 2019/0004973 A1* | 1/2019 | Chhabra | G06F 12/1408 |
| 2019/0042319 A1* | 2/2019 | Sood | G06F 21/74 |
| 2019/0042783 A1* | 2/2019 | Guim Bernat | H04L 9/0894 |
| 2019/0044927 A1* | 2/2019 | Sood | G06F 9/45533 |
| 2019/0079789 A1 | 3/2019 | Mahkonen et al. | |
| 2019/0141536 A1* | 5/2019 | Bachmutsky | H04L 67/10 |
| 2019/0147188 A1* | 5/2019 | Benaloh | G06F 21/6245 726/26 |
| 2019/0227949 A1* | 7/2019 | Bernat | G06F 11/3476 |
| 2019/0251266 A1* | 8/2019 | Tuttle | G06F 21/575 |
| 2019/0332812 A1* | 10/2019 | Stearns | G06F 21/70 |
| 2019/0370173 A1 | 12/2019 | Boyer et al. | |
| 2020/0004589 A1 | 1/2020 | Geiger et al. | |
| 2021/0055996 A1 | 2/2021 | Owens et al. | |
| 2021/0058345 A1 | 2/2021 | Yoon et al. | |

OTHER PUBLICATIONS

United States Patent and Trademark Office, "Final Office Action," in connection with U.S. Appl. No. 16/368,987, issued Jun. 17, 2021, 8 pages.

United States Patent and Trademark Office, "Advisory Action," in connection with U.S. Appl. No. 16/368,987, issued Nov. 5, 2021, 2 pages.

United States Patent and Trademark Office, "Notice of Allowance and Fee(s) Due," in connection with U.S. Appl. No. 16/368,987, issued Dec. 13, 2021, 5 pages.

* cited by examiner

TECHNOLOGIES FOR ACCELERATED EDGE DATA ACCESS AND PHYSICAL DATA SECURITY FOR EDGE DEVICES

RELATED APPLICATION

This patent arises from a continuation of U.S. patent application Ser. No. 16/368,987, (now U.S. Pat. No. 11,301,396) which was filed on Mar. 29, 2019. U.S. patent application Ser. No. 16/368,987 is hereby incorporated herein by reference in its entirety. Priority to U.S. patent application Ser. No. 16/368,987 is hereby claimed.

BACKGROUND

Certain cloud computing architectures may provide function as a service (FaaS) services. Typical FaaS systems allow a client to invoke a particular function on-demand, without executing a dedicated service process. A FaaS function may be performed by an appliance composed of multiple components. The number or amount of users executing FaaS services may be unbounded.

Edge computing is an emerging paradigm in which compute is located at the edge cloud, for example with wireless network base stations. In edge computing systems, users typically have mobility and may jump between edge access points.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
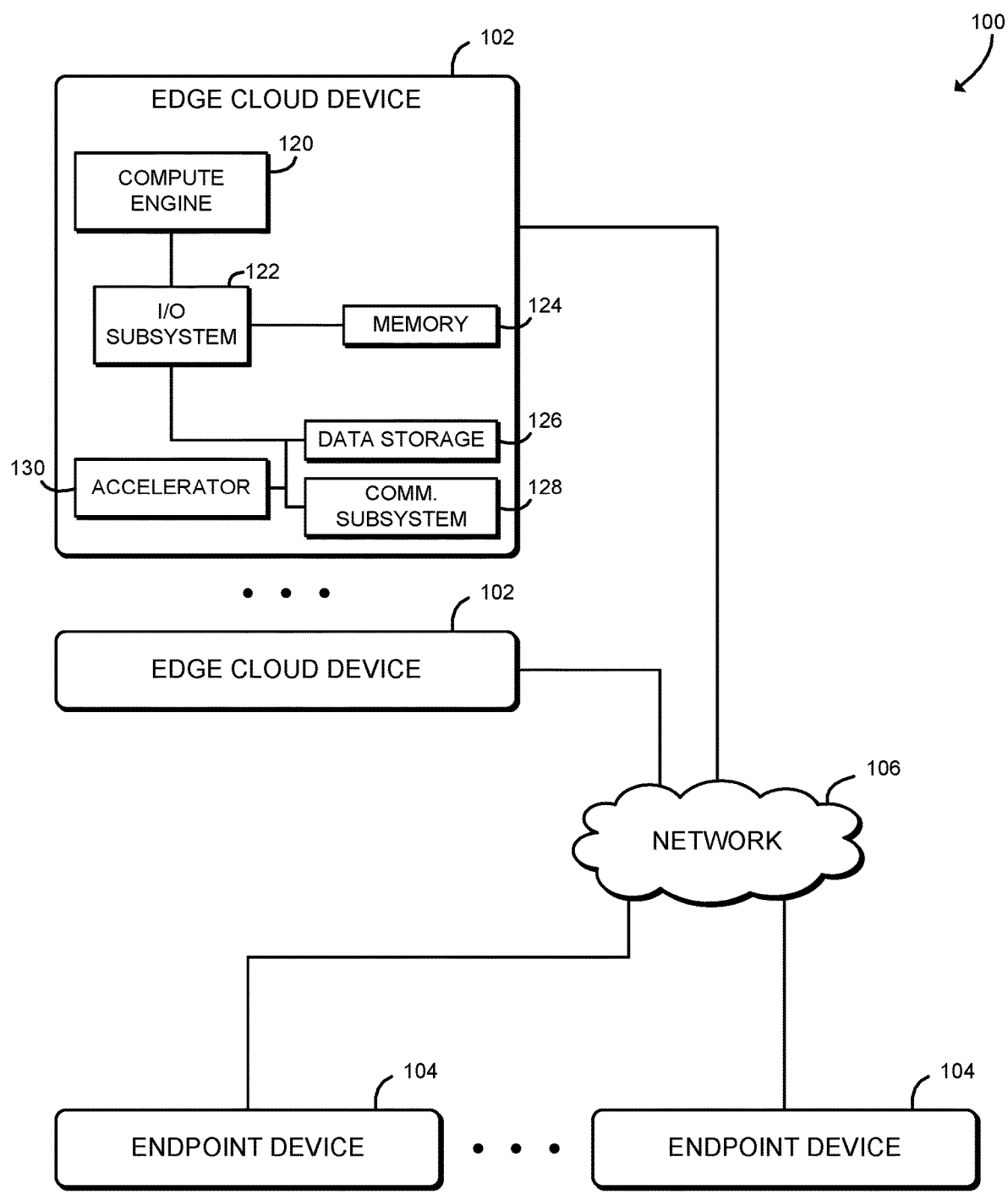
FIG. 1 is a simplified block diagram of at least one embodiment of a system for accelerated edge data access.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require a preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

Referring now to FIG. 1, a system 100 for accelerated edge data access includes multiple edge cloud devices 102 and multiple endpoint devices 104 in communication over an edge network 106. In use, as described further below, an edge cloud device 102 executes one or more services (e.g., virtual machines, virtual network functions (VNFs), function-as-a-service (FaaS) instances, or other services) provided by or otherwise associated with a tenant. Each service processes requests associated with an endpoint device 104 (e.g., a mobile phone, a vehicle, or other endpoint device) for a user. The service generates accesses to data associated with virtual addresses (e.g., virtual memory addresses, logical block addresses, etc.). Address decoder logic of the edge cloud device 102 uses an edge translation table to translate the virtual address into an edge location. The edge location identifies data resources that may be local to the edge cloud device 102 or stored by another edge cloud device 102 in the edge network 106. The edge cloud device 102 may store updated data locally and/or localize remote resources and then update the edge translation table accordingly. The service may be migrated to a target edge cloud device 102 by migrating the edge translation table to the target edge cloud device 102. Determinations of whether to localize resources and/or whether to migrate services may be performed by hardware-accelerated logic of the edge cloud device 102. The hardware accelerated logic may be provided by the tenant and thus may be customizable per-tenant. Therefore, the system 100 provides services with virtual address access to resources (e.g., storage, memory, or other resources) that may be distributed throughout an edge cloud network 106. Accordingly, the system 100 allows services to be migrated throughout the edge cloud network 106 while maintaining the location that homes the last valid version of each particular chunk of data. Thus, the system 100 may lower total cost of ownership, provide low-latency migration using hardware acceleration, and coordinate protocol migration between endpoint devices and the edge cloud. In particular, the system 100 may improve performance whether latencies between edge cloud devices (e.g., base stations or central offices) is on the order of sub-millisecond. The system 100 may improve performance where services are heavily migrating across the edge infrastructure and are not heavily storage-bound. The system 100 may also be used along with other migration approaches (e.g., prefetching) for storage-bound applications.

Each edge cloud device 102 may be embodied as any type of device capable of performing the functions described herein. For example, the edge cloud device 102 may be embodied as, without limitation, a computer, a server, a workstation, a multiprocessor system, a distributed computing device, a switch, a router, a network device, a virtualized system (e.g., one or more functions executed in virtualized environment(s), such as virtual machine(s) or container(s), in which the underlying hardware resources appear as physical hardware to software executing in the virtualized environment(s), but are separated from the software by an abstraction layer), and/or a consumer electronic device. Additionally or alternatively, the edge cloud device 102 may be embodied as a one or more compute sleds, memory sleds, or other racks, sleds, computing chassis, or other components of a physically disaggregated computing device. As shown in FIG. 1, the illustrative edge cloud device 102 includes a compute engine 120, an I/O subsystem 122, a memory 124, a data storage device 126, and a communication subsystem 128. Additionally, in some embodiments, one or more of the illustrative components may be incorporated in, or otherwise form a portion of, another component. For example, the memory 124, or portions thereof, may be incorporated in the compute engine 120 in some embodiments.

The compute engine 120 may be embodied as any type of compute engine capable of performing the functions described herein. For example, the compute engine 120 may be embodied as a single or multi-core processor(s), digital signal processor, microcontroller, field-programmable gate array (FPGA), or other configurable circuitry, application-specific integrated circuit (ASIC), or other processor or processing/controlling circuit or virtualized version thereof. Similarly, the memory 124 may be embodied as any type of volatile or non-volatile memory or data storage capable of performing the functions described herein. In operation, the memory 124 may store various data and software used during operation of the edge cloud device 102 such as operating systems, applications, programs, libraries, and drivers. As shown, the memory 124 may be communicatively coupled to the compute engine 120 via the I/O subsystem 122, which may be embodied as circuitry and/or components to facilitate input/output operations with the compute engine 120, the memory 124, and other components of the edge cloud device 102. For example, the I/O subsystem 122 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 124 may be directly coupled to the compute engine 120, for example via an integrated memory controller hub. Additionally, in some embodiments, the I/O subsystem 122 may form a portion of a system-on-a-chip (SoC) and be incorporated, along with the compute engine 120, the memory 124, the accelerator 130, and/or other components of the edge cloud device 102, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The communications subsystem 128 may be embodied as any communication circuit, device, or collection thereof, capable of enabling communications between the edge cloud device 102 and other remote devices over the network 106. The communications subsystem 128 may be configured to use any one or more communication technology (e.g., wired or wireless communications) and associated protocols (e.g., Ethernet, Bluetooth®, Wi-Fi®, WiMAX, 3G, 4G LTE, 5G, etc.) to effect such communication.

The accelerator 130 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator 130 is an FPGA, which may be embodied as an integrated circuit including programmable digital logic resources that may be configured after manufacture. The FPGA may include, for example, a configurable array of logic blocks in communication over a configurable data interchange. The accelerator 130 may be coupled to the compute engine 120 via a high-speed connection interface such as a peripheral bus (e.g., a PCI Express bus) or an inter-processor interconnect (e.g., a Unified Path Interconnect (UPI)), or via any other appropriate interconnect. In some embodiments, the accelerator 130 may be incorporated in or otherwise coupled with one or more other components of the edge cloud device 102, such as a network interface controller (NIC) and/or host fabric interface (HFI) of the communication subsystem 128.

Each endpoint device 104 may be embodied as any type of computation or computer device capable of performing the functions described herein, including, without limitation, a computer, a mobile computing device, a wearable computing device, a network appliance, a web appliance, a distributed computing system, an autonomous vehicle, an autonomous aerial vehicle, an Internet of Things (IoT) sensor, an IoT gateway, an industrial automation device, a processor-based system, and/or a consumer electronic device. As such, each endpoint device 104 may include components and features similar to the edge cloud device 102, such as a compute engine 120, I/O subsystem 122, memory 124, data storage 126, communication subsystem 128, and/or various peripheral devices. Those individual components of each endpoint device 104 may be similar to the corresponding components of the edge cloud device 102, the description of which is applicable to the corresponding components of the endpoint device 104 and is not repeated for clarity of the present description.

As discussed in more detail below, the edge cloud devices 102 and the endpoint devices 104 may be configured to transmit and receive data with each other and/or other devices of the system 100 over the network 106. The network 106 may be embodied as any number of various wired and/or wireless networks, or hybrids or combinations thereof. For example, the network 106 may be embodied as, or otherwise include a mobile access network, a network edge infrastructure, a wired or wireless local area network (LAN), and/or a wired or wireless wide area network (WAN). As such, the network 106 may include any number of additional devices, such as additional base stations, access points, computers, routers, and switches, to facilitate communications among the devices of the system 100. In the illustrative embodiment, the network 106 is embodied as an edge network fabric.

Figure 2:
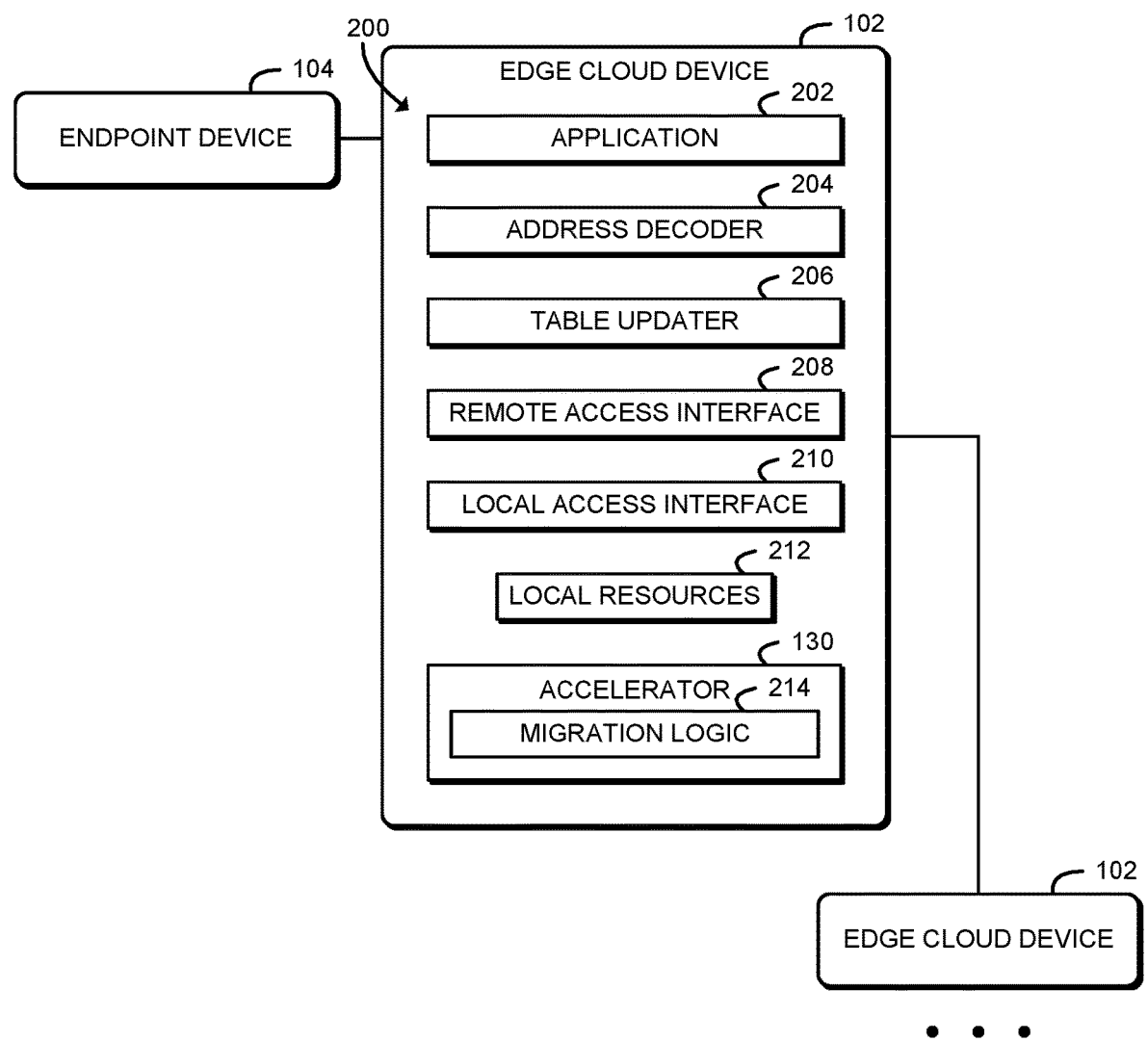
FIG. 2 is a simplified block diagram of at least one embodiment of an environment of an edge cloud device of the system of FIG. 1.

Referring now to FIG. 2, in an illustrative embodiment, each edge cloud device 102 establishes an environment 200 during operation. The illustrative environment 200 includes an application 202, an address decoder 204, a table updater 206, a remote access interface 208, a local access interface 210, and migration logic 214. The various components of the environment 200 may be embodied as hardware, firmware, software, or a combination thereof. As such, in some embodiments, one or more of the components of the environment 200 may be embodied as circuitry or collection of electrical devices (e.g., application circuitry 202, address decoder circuitry 204, table updater circuitry 206, remote access interface circuitry 208, local access interface circuitry 210, and/or migration logic circuitry 214). It should be appreciated that, in such embodiments, one or more of the application circuitry 202, the address decoder circuitry 204, the table updater circuitry 206, the remote access interface circuitry 208, the local access interface circuitry 210, and/or the migration logic circuitry 214 may form a portion of the compute engine 120, the I/O subsystem 122, the memory 124, the data storage device 126, the accelerator 130, and/or other components of the edge cloud device 102. Additionally, in some embodiments, one or more of the illustrative components may form a portion of another component and/or one or more of the illustrative components may be independent of one another.

The application 202 may be embodied as a virtual machine, a virtualized network function (VNF), a function as a service (FaaS) instance, or other service executed by the edge cloud device 702. In some embodiments, the application 202 may service requests associated with one or more endpoint devices 104. The application 202 is configured to generate an access request from a service executed by the edge cloud device 102 to a virtual address. The access request may be embodied as a read request, a write request, or other data access request. As described further below, the virtual address of the request may be resolved to one or more local resources 212 of the edge cloud device 102 and/or remote resources in the edge cloud network 106.

The address decoder 204 is configured to translate the virtual address of the access request to an edge location address based on an edge translation table associated with the service. The edge translation table may include multiple mappings from virtual addresses to corresponding edge location addresses. Each edge location address may be indicative of a local resource 212 of the edge cloud device 102 or a remote resource. The address decoder 204 is further configured to determine whether the edge location address is local to the edge cloud device 102 (e.g., referencing one or more local resources 212) or not local (e.g., one or more remote resources of a remote edge cloud device 102).

The table updater 206 is configured to determine whether the access request is a modification request if the edge location is not local to the edge cloud device 102. If the access request is a modification request, the table updater 206 is further configured to update the edge translation table based on a local resource 212 used to perform the request, as described further below.

The local access interface 210 is configured to perform the access request with a local resource 212 of the edge cloud device 102 in response to determining that the edge location address is local to the edge cloud device 102. The local access interface 210 is further configured to perform the access request with a local resource 212 of the edge cloud device 102 in response to determining that the edge location address is not local and that the access request is a modification request. For example, the local access interface 210 may write data associated with the access request to a local memory or data storage resource.

The remote access interface 208 is configured to perform the access request with a remote resource in response to determining that the edge location address is not local and that the access request is not a modification request. For example, the remote access interface 208 may read data associated with the access request from a remote edge cloud device 102.

The migration logic 214 is configured to determine whether to localize the access request in response to determining the edge location address is not local and that the access request is not a modification request (e.g., that the access request is a read request). The migration logic 214 is further configured to copy data from the remote resource to a local resource 212 of the edge cloud device 102 in response to determining to localize the access request and to update the edge translation table based on the local resource 212.

The migration logic 214 may be further configured to determine whether to migrate the service to a remote edge cloud device 102. For example, the determination of whether to migrate the service may be based on telemetry of a connection between the endpoint device 104 and the edge cloud device 102, based on a hint received from a central office or other management or orchestration entity, based on receiving a request to migrate the service from the endpoint device 104, and/or based on a priority associated with the service or a deadline associated with migrating the service. In response to determining to migrate the service, the migration logic 214 is configured to notify the endpoint device 104 associated with the service, hibernate the service, and send the edge translation table to the remote edge cloud device 102 in response to hibernating the service. The migration logic 214 is configured to migrate the service to the remote edge cloud device 102 in response to sending the edge translation table, for example by sending a sending a service identifier and an edge device identifier to the remote edge cloud device 102 and requesting the remote edge cloud device 102 to resume the service.

In some embodiments, the migration logic 214 may be configured to receive an edge translation table from a remote edge cloud device 102, migrate a service associated with the edge translation table from the remote edge cloud device 102; and resume the service. The migration logic 214 may be further configured to send a notification to an endpoint device 104 associated with the migrated service in response to resuming the service.

As shown in FIG. 2, the migration logic 214 may be included in an accelerator 130, such as an FGPA. Thus, those operations of the migration logic 214 may be performed by the accelerator 130.

Figure 3:
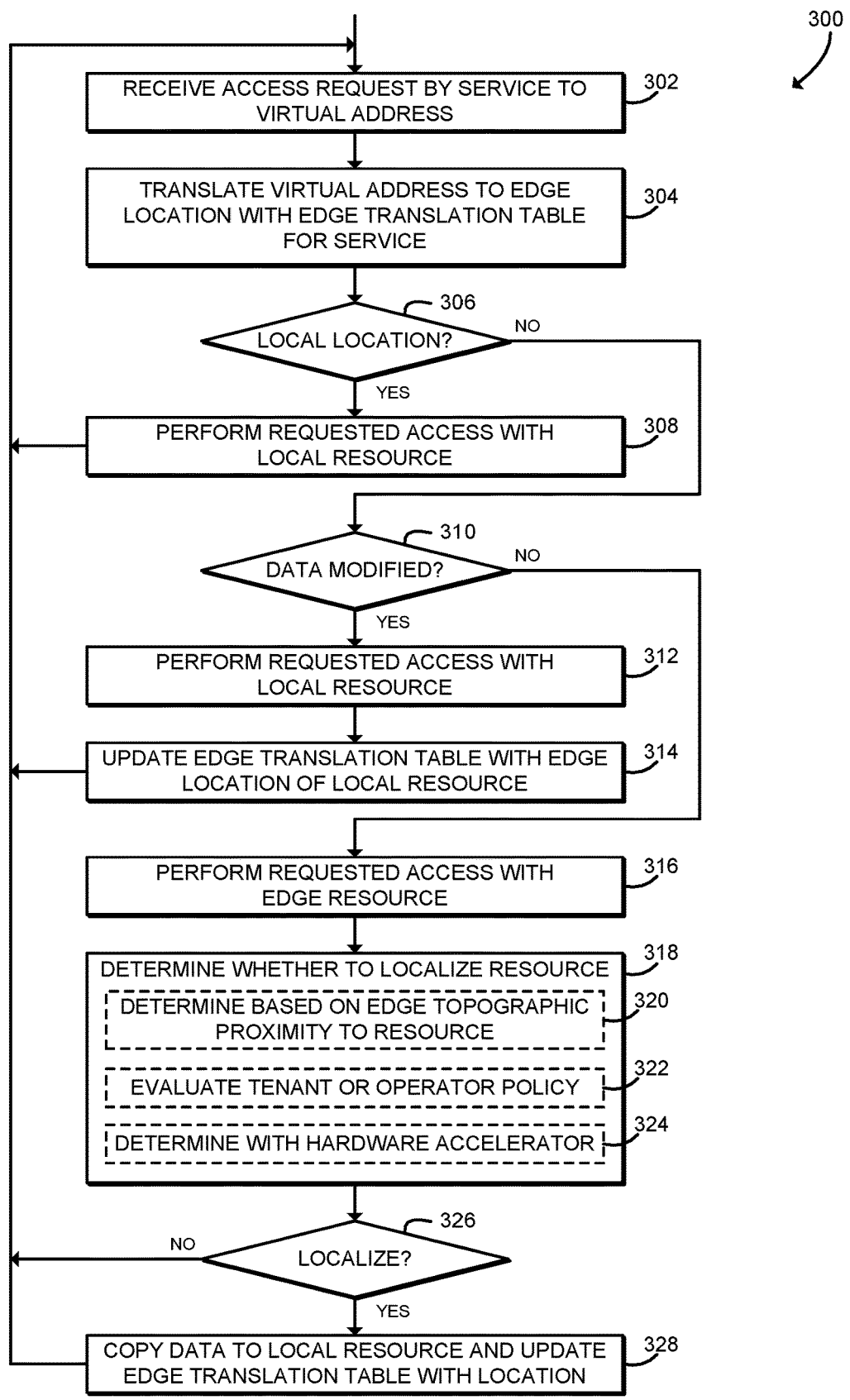
FIG. 3 is a simplified flow diagram of at least one embodiment of a method for accelerated edge data resource translation and access that may be executed by an edge cloud device of the system of FIGS. 1-2.

Referring now to FIG. 3, in use, the edge cloud device 102 may execute a method 300 for accelerated edge data resource translation and access. It should be appreciated that, in some embodiments, the operations of the method 300 may be performed by one or more components of the environment 200 of the edge cloud device 102 as shown in FIG. 2. The method 300 begins in block 302, in which the edge cloud device 102 receives an access request by a service to a virtual address. The service is associated with an endpoint device 104, and each service is associated with a tenant or other user of the edge cloud device 102. The access request may be embodied as a read request, a write request, or other data access request. The virtual address of the request may be embodied as a virtual memory address, a virtual logical block address, or other identifier associated with a particular data item in an address space. The request may be received from a memory or storage controller by a component coupled to an internal fabric of the compute engine 120, the I/O subsystem 122, an SoC of edge cloud device 102, or other internal fabric. For example, the request may be received by a virtual edge storage controller, a system address decoder, a cache agent, or other address translation component.

In block 304, the edge cloud device 102 translates the virtual address to an edge location using an edge translation table associated with the service that generated the request. The edge translation table may be embodied as one or more mappings between virtual addresses and edge locations. For example, each entry of the edge translation table may map a virtual address range (e.g., a range of memory pages, cache lines, storage blocks, storage pages, or other data range) to an edge location. Each edge location may include an identifier of a remote edge cloud device 102 (e.g., a UUID, a network address, or other identifier) and a corresponding address range (e.g., a range of memory pages, storage blocks, storage pages, or other data range). As indicated above, each service may be associated with a different edge translation table or, in some embodiments, a part of a larger edge translation table. Thus, each service may establish a different virtual address space.

In block 306, the edge cloud device 102 determines whether the translated edge location is local to the edge cloud device 102. If not, the method 300 branches ahead to block 310, described below. If the translated edge location is local to the edge cloud device 102, the method 300 proceeds to block 308.

In block 308, the edge cloud device 102 performs the requested access with one or more local resources. The edge cloud device 102 may access, for example, one or more cache lines, memory pages, or other memory resources of the memory 124, one or more data blocks, data pages, or other storage resources of the data storage device 126, or other local resources of the edge cloud device 102. As described above, the requested access may include read access, write access, or other data access. After performing the requested access, the method 300 loops back to block 302 to process additional requests.

Referring back to block 306, if the edge cloud device 102 determines that the translated edge location is not local to the edge cloud device 102 (i.e., the access is remote), the method 300 branches to block 310. In block 310, the edge cloud device 102 determines whether the access request is for data modification. For example, the edge cloud device 102 may determines whether the access is a write, an overwrite, or another access that modifies the contents of the remote resource. If the request is not a modification, the method 300 branches to block 316, described further below. If the request is a modification, the method 300 advances to block 312.

In block 312, the edge cloud device 102 performs the requested access with a local resource of the edge cloud device 102. For example, the edge cloud device 102 may modify one or more cache lines, memory pages, or other memory resources of the memory 124, one or more data blocks, data pages, or other storage resources of the data storage device 126, or other local resources of the edge cloud device 102. Because the access is a modification, the edge cloud device 102 may not need to request the original data from the remote edge location.

In block 314, the edge cloud device 102 updates the edge translation table with the edge location of the local resource that was updated as described above. After updating the edge translation table, future accesses to that virtual address may be directed to the local resource of the edge cloud device 102. After updating the edge translation table, the method 300 loops back to block 302 to process additional requests.

Referring back to block 310, if the request is not a modification, the method 300 branches to block 316, in which the edge cloud device 102 performs the requested access with a remote edge resource. For example, the edge cloud device 102 may send an access request to a remote edge cloud device 102 that is identified by the translated edge location of the request. That remote edge cloud device 102 may respond with data read from one or more cache lines, memory pages, other memory resources, data blocks, data pages, other storage resources and/or other resources of the remote edge cloud device 102.

In block 318, the edge cloud device 102 determines whether to localize the remote resource. As described further below, localizing the resource may include copying the remote resource data to a local resource and directing further accesses to that local resource. Thus, localizing the resource may improve performance for repeated accesses to the same virtual address. The edge cloud device 102 may use any appropriate algorithm to determine whether to localize the resource.

In some embodiments, in block 320 the edge cloud device 102 may determine whether to localize the resource based on edge topographic proximity of the edge cloud device 102 to the resource. For example, the edge cloud device 102 may determine how far away the remote data is stored (e.g., the network topographic or physical distance between mobile base stations). The edge cloud device 102 may determine whether the next service migration hop (e.g., a next wireless base station likely to be accessed by the endpoint device 104) is likely to be further away from the current, remote position of the data. In that circumstance, the edge cloud device 102 may determine to localize the resource in order to improve performance for the likely next hop.

In some embodiments, in block 322 the edge cloud device 102 may evaluate a tenant or operator policy to determine whether to localize the resource. In those embodiments, each tenant and/or operator may provide a customized algorithm or policy for localizing resources. In some embodiments, in block 324 the determination of whether to localize the resource is made by the hardware accelerator 130. For example, the determination may be performed by an accelerator functional unit (AFU) of an FPGA or other accelerated logic of the edge cloud device 102. In those embodiments, each tenant and/or operator may supply a tenant bitstream, a tenant AFU, or other per-tenant accelerated logic to determine whether to localize the resource.

In block 326, the edge cloud device 102 checks whether to localize the resource. If not, the method 300 loops back to block 302 to process additional requests. If the edge cloud device 102 determines to localize the resource, the method 300 advances to block 328, in which the edge cloud device 102 copies data from the remote edge location to a local resource of the edge cloud device 102 and updates the edge translation table. For example, the edge cloud device 102 may copy data to one or more cache lines, memory pages, or other memory resources of the memory 124, one or more data blocks, data pages, or other storage resources of the data storage device 126, or other local resources of the edge cloud device 102. As described above, after updating the edge translation table, future accesses to that virtual address may be directed to the local resource of the edge cloud device 102. After localizing the resource, the method 300 loops back to block 302 to continue processing requests.

Figure 4:
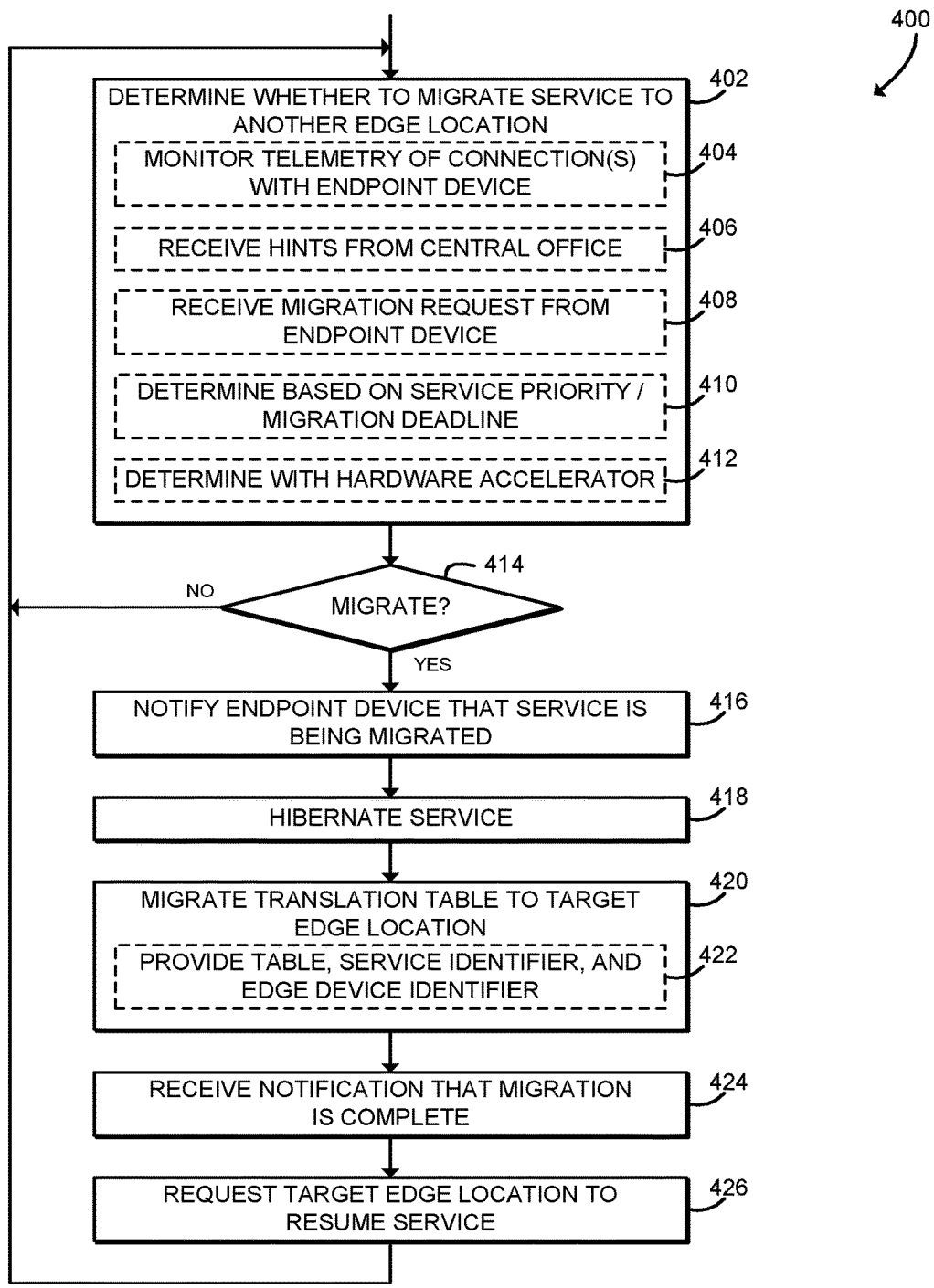
FIG. 4 is a simplified flow diagram of at least one embodiment of a method for service migration initiation that may be executed by an edge cloud device of the system of FIGS. 1-2.

Referring now to FIG. 4, in use, the edge cloud device 102 may execute a method 400 for initiating a service migration. It should be appreciated that, in some embodiments, the operations of the method 400 may be performed by one or more components of the environment 200 of the edge cloud device 102 as shown in FIG. 2, such as the accelerator 130. The method 400 begins in block 402, in which the edge cloud device 102 determines whether to migrate a service to another edge location (e.g., to a different edge cloud device 102). The edge cloud device 102 may migrate the service, for example, in order to follow an endpoint device 104 associated with a user travelling between base stations or other edge cloud devices 102. The determination may be based on telemetry or other potential data sources. In some embodiments, the edge cloud device 102 may identify a particular target edge cloud device 102 for the migrated service.

In some embodiments, in block 404 the edge cloud device 102 monitors telemetry of one or more network connections with the endpoint device 104. For example, the edge cloud device 102 may determine signal quality between the endpoint device 104 and the edge cloud device 102 or other potential base stations. A migration to another edge location may depend on the physical location of radio base stations (radio network planning), the mobility of the subscriber or endpoint device 104, the mobility of other subscribers, aggregation of multiple bands/base stations, or other factors. In some embodiments, the edge cloud device 102 may monitor the trajectory of motion or other trends associated with the endpoint device 104.

In some embodiments, in block 406, the edge cloud device 102 may receive one or more hints regarding migration from a central office or other more-centralized edge cloud device 102. The central office may be aware that services for a particular endpoint device 104 and/or tenant should be migrated. In some embodiments, in block 408 the edge cloud device 102 may receive a migration request from an endpoint device 104. Similar to the central office, the endpoint device 104 may also be aware that services should be migrated to a different edge cloud device 102. In some embodiments, in block 410, the edge cloud device 102 may determine whether to migrate the service based on one or more service priorities or migration deadlines. For example, a higher-priority service may be migrated before other services in order to ensure lower latency and/or uninterrupted service for an endpoint device 104, or a service may be migrated in order to meet a migration deadline.

In some embodiments, in block 412 the edge cloud device 102 determines whether to migrate the service using the hardware accelerator 130. In particular, the telemetry, hints, and other data sources may be provided to the hardware accelerator 130, which may determine whether to migrate the service. Each tenant may provide a per-tenant accelerator functional unit (AFU), bitstream, or other accelerated logic to be executed by the hardware accelerator 130 in order to determine whether to migrate the service. The edge cloud device 102 may expose one or more management interfaces to register bitstreams or other accelerated logic to be executed by the hardware accelerator 130.

In block 414, the edge cloud device 102 checks whether to migrate the service. If not, the method 400 loops back to block 402 to continue determining whether to migrate the service. If the edge cloud device 102 determines to migrate the service, the method 400 advances to block 416.

Figure 6:
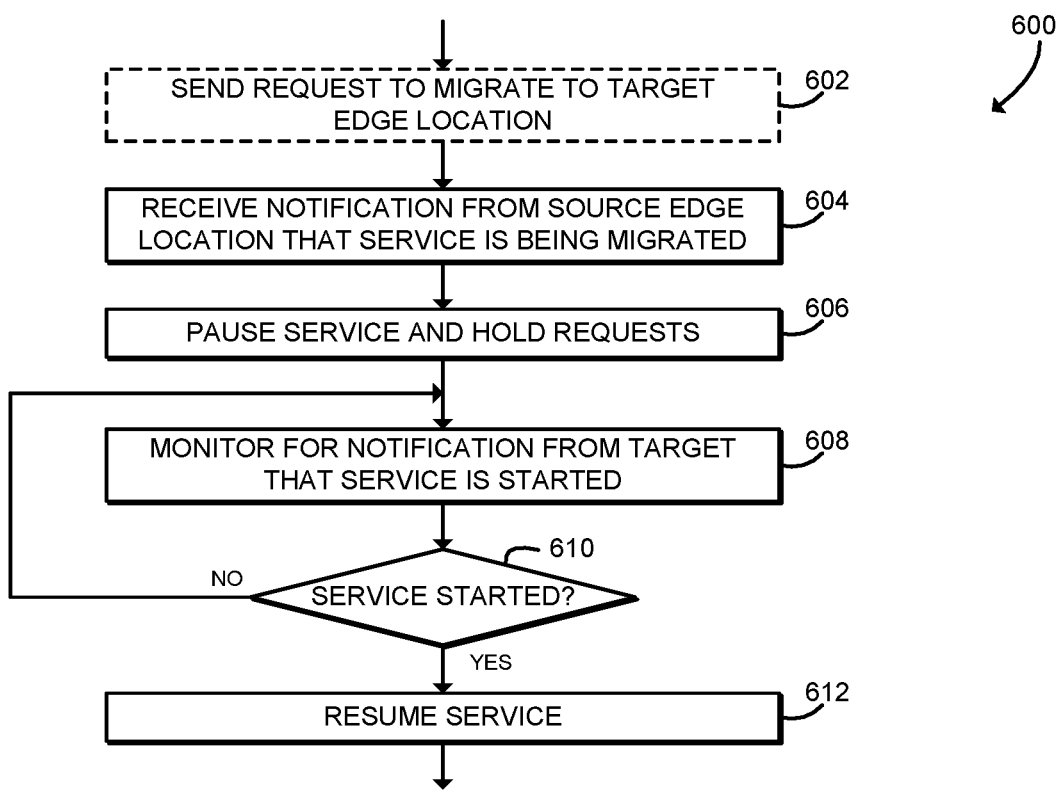
FIG. 6 is a simplified flow diagram of at least one embodiment of a method for service migration that may be executed by an endpoint device of the system of FIGS. 1-2.

In block 416, the edge cloud device 102 notifies the endpoint device 104 that the service is being migrated. After being notified, the endpoint device 104 may pause operations or otherwise hold service requests. One potential embodiment of a method that may be executed by the endpoint device 104 is shown in FIG. 6 and described below.

In block 418, the edge cloud device 102 hibernates the service. The edge cloud device 102 may, for example, suspend operations and/or save the state of a virtual machine, a VNF, or another service provider executed by the edge cloud device 102. The edge cloud device 102 may generate a hibernation image representing the hibernated service, which may include saved state and other information related to the hibernated image.

Figure 5:
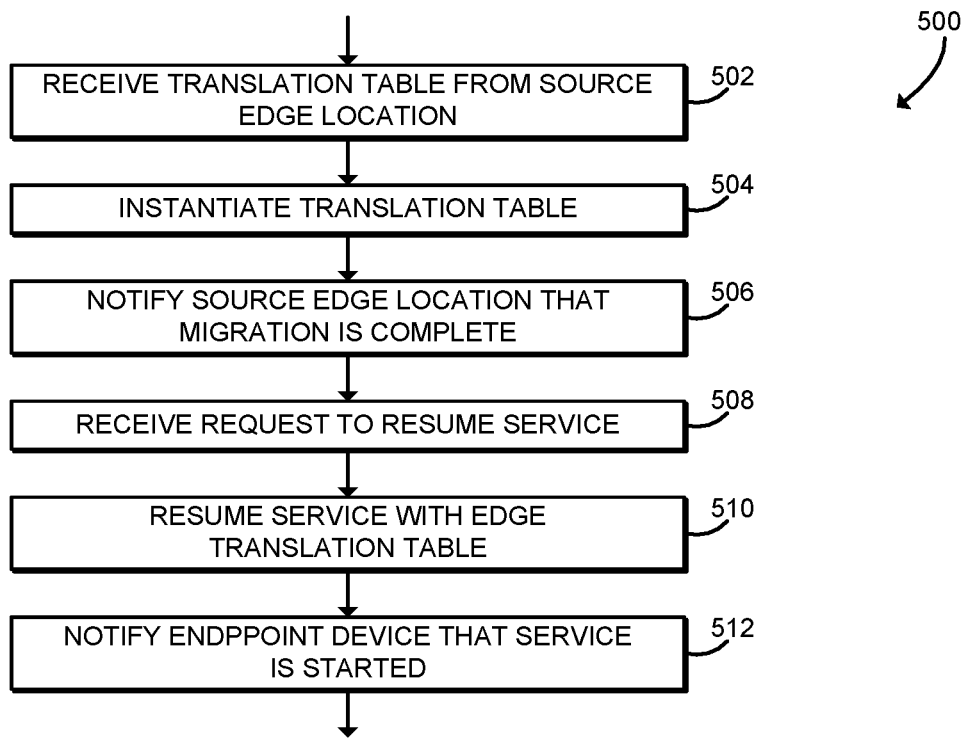
FIG. 5 is a simplified flow diagram of at least one embodiment of a method for service migration targeting that may be executed by an edge cloud device of the system of FIGS. 1-2.

In block 420, the edge cloud device 102 migrates the edge translation table for the service to be migrated to a target edge location (e.g., the target edge cloud device 102). As described above in connection with FIG. 3, the edge translation table identifies edge locations for virtual addresses associated with the service, and is updated in operation by the edge cloud device 102. The edge cloud device 102 may use any appropriate technique to migrate the edge translation table to the target edge location. For security, the edge translation table may be encrypted with one or more keys associated with the associated tenant. In some embodiments, in block 422 the edge cloud device 102 may provide the edge translation table, a service identifier, and an endpoint device 104 identifier to the target edge cloud device 102. After migrating the edge translation table, the edge cloud device 102 waits for the target edge location to complete migration. One potential embodiment of a method for instantiating the edge translation table that may be executed by the destination edge cloud device 102 is shown in FIG. 5 and described below. In block 424, the edge cloud device 102 receives a notification from the target edge location that migration is complete.

In block 426, the edge cloud device 102 requests the target edge location (e.g., the target edge cloud device 102) to resume the migrated service. After resuming service, the target edge cloud device 102 may use the migrated edge translation table to service requests from the associated endpoint device 104. After resuming the service, the method 400 loops back to block 402 to continue determining whether to migrate services.

Referring now to FIG. 5, in use, the edge cloud device 102 may execute a method 500 for receiving a service migration. It should be appreciated that, in some embodiments, the operations of the method 500 may be performed by one or more components of the environment 200 of the edge cloud device 102 as shown in FIG. 2, such as the accelerator 130. The method 500 begins in block 502, in which the edge cloud device 102 receives an edge translation table from a source edge location, such as another edge cloud device 102. As described above in connection with FIG. 4, the source edge location transfers the edge translation table when migrating a service to another edge location.

In block 504, the edge cloud device 102 instantiates the edge translation table received from the source edge location. The edge cloud device 102 may use any technique to enable or otherwise activate the edge translation table. For example, the edge cloud device 102 may store the edge translation table locally and then update a system address decoder (SAD) or other translation logic with a pointer to the edge translation table. In block 506, after instantiating the edge translation table, the edge cloud device 102 notifies the source edge location (e.g., the source edge cloud device 102) that the migration is complete.

In block 508, the edge cloud device 102 receives a request to resume the service. In block 510, after receiving the request, the edge cloud device 102 resumes the service using the migrated edge translation table. The edge cloud device 102 may restore saved state of the service, load a hibernation image, or otherwise resume operations of the service. In block 512, the edge cloud device 102 notifies the endpoint device 104 that the service is started or resumed. After notification, the endpoint device 104 may resume issuing service requests to the edge cloud device 102. The edge cloud device 102 may translate virtual address requests into edge locations using the edge translation table as described above in connection with FIG. 3. After migrating and resuming the service, the method 500 is completed. In some embodiments, the method 500 may be repeated when migrating a different service to the edge cloud device 102.

It should be appreciated that, in some embodiments, the methods 300, 400, and/or 500 may be embodied as various instructions stored on a computer-readable media, which may be executed by the compute engine 120, the I/O subsystem 122, the accelerator 130, and/or other components of the edge cloud device 102 to cause the edge cloud device 102 to perform the respective method 300, 400, and/or 500. The computer-readable media may be embodied as any type of media capable of being read by the edge cloud device 102 including, but not limited to, the memory 124, the data storage device 126, firmware devices, other memory or data storage devices of the edge cloud device 102, portable media readable by a peripheral device of the edge cloud device 102, and/or other media.

Referring now to FIG. 6, in use, an endpoint device 104 may execute a method 600 for service migration. The method 600 begins in block 602, in which in some embodiments, the endpoint device 104 may send a request to migrate a service from a source edge location to a target edge location (e.g., from a source edge cloud device 102 to a target edge cloud device 102). For example, the endpoint device 104 may determine that it is closer or will become closer in proximity to the target edge cloud device 102. The endpoint device 104 may send the request to a current base station or other edge cloud device 102 that is currently providing services to the endpoint device 104. Of course, as described above in connection with FIG. 4, the determination to migrate a service may be made by one or more other entities, such as the edge cloud devices 102 themselves, a central office device, or other device.

In block 604, the endpoint device 104 receives a notification that a service is being migrated. As described above in connection with FIG. 4, the notification is received from the source edge cloud device 102 that is currently providing services to the endpoint device 104. In block 606, the endpoint device 104 pauses the service and holds requests. The endpoint device 104 may queue or otherwise store any requests until after the migration is completed.

In block 608, the endpoint device 104 monitors for a notification from the target edge location (e.g., a target edge cloud device 102) that the service has been started, restarted, or otherwise resumed. As described above in connection with FIG. 5, the notification may be sent after the target edge cloud device 102 has instantiated an edge translation table and otherwise prepared to service requests from the endpoint device 104. In block 610, the endpoint device 104 determines whether the service has been started. If not, the method 600 loops back to block 608 to continue monitoring for notifications from the target edge location. If the service has started, the method 600 advances to block 612.

In block 612, the endpoint device 104 resumes the service. The endpoint device 104 may start issuing service requests to the target edge cloud device 102. In some embodiments, the endpoint device 104 may issue one or more queued requests. As described above in connection with FIG. 3, the edge cloud device 102 may use the edge translation table to service those requests. After resuming the service, the method 600 is completed. The method 600 may be repeated if the service is migrated to another target edge location.

It should be appreciated that, in some embodiments, the method 600 may be embodied as various instructions stored on a computer-readable media, which may be executed by the compute engine, the I/O subsystem, and/or other components of the endpoint device 104 to cause the endpoint device 104 to perform the method 600. The computer-readable media may be embodied as any type of media capable of being read by the endpoint device 104 including, but not limited to, memory or data storage devices or firmware devices of the endpoint device 104, portable media readable by a peripheral device of the endpoint device 104, and/or other media.

Figure 7:
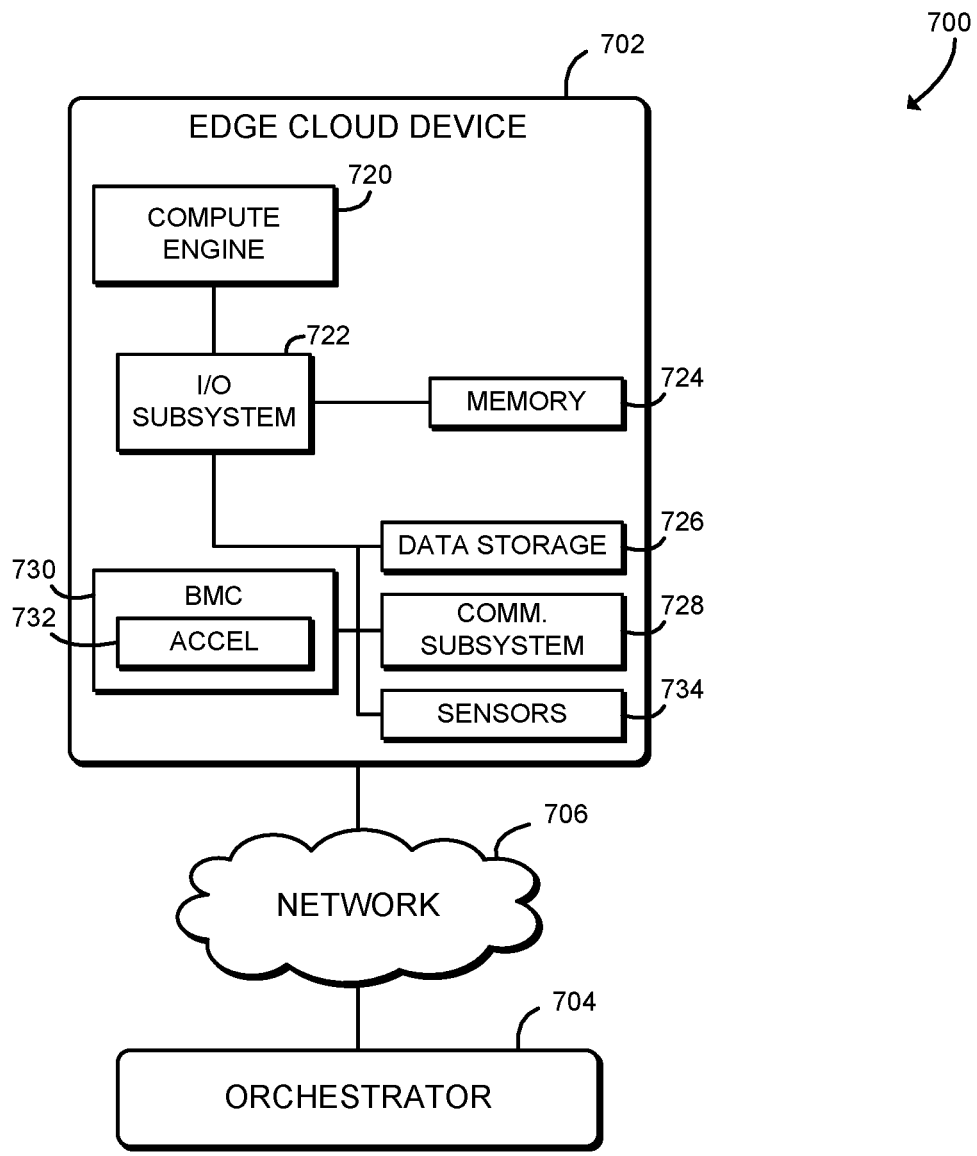
FIG. 7 is a simplified block diagram of at least one embodiment of a system for physical data security.

Referring now to FIG. 7, a system 700 for physical data security includes multiple edge cloud devices 702 and an orchestrator 704 in communication over a network 706. In use, as described further below, a baseboard management controller (BMC) of an edge cloud device 702 collects telemetry that may be used to identify a potential physical attack to the edge cloud device 702 (e.g., a cabinet being opened, a cold boot attack, the device being moved, etc.). Based on that telemetry data, programmable logic determines whether a potential attack is occurring and whether data should be securely wiped from the edge cloud device 702. This determination may be performed independently for each tenant of the edge cloud device 702, and may be performed by accelerated hardware of the BMC. Each tenant may provide custom logic or another custom policy to determine whether an attack is detected. If an attack is detected, the BMC instructs data resources of the edge cloud device 702 (e.g., memory devices, storage devices, device buffers, etc.) to wipe the tenant data. After the tenant data is wiped, the tenant data is secure from an attacker even if the edge cloud device 702 is physically compromised. Thus, the system 700 may allow for each tenant to provide customized hardening against physical attacks. Improved resistance to physical attack may be particularly beneficial for edge infrastructure devices, where each edge cloud device 702 may be located outdoors, located in an inaccessible or remote location, located remote from human surveillance, or otherwise located in difficult-to-manage physical environments.

Each edge cloud device 702 may be embodied as any type of device capable of performing the functions described herein. For example, the edge cloud device 702 may be embodied as, without limitation, a computer, a server, a workstation, a multiprocessor system, a distributed computing device, a switch, a router, a network device, and/or a consumer electronic device. Additionally or alternatively, the edge cloud device 702 may be embodied as a one or more compute sleds, memory sleds, or other racks, sleds, computing chassis, or other components of a physically disaggregated computing device. As shown in FIG. 1, the illustrative edge cloud device 702 includes a compute engine 720, an I/O subsystem 722, a memory 724, a data storage device 726, and a communication subsystem 728. Additionally, in some embodiments, one or more of the illustrative components may be incorporated in, or otherwise form a portion of, another component. For example, the memory 724, or portions thereof, may be incorporated in the compute engine 720 in some embodiments.

The compute engine 720 may be embodied as any type of compute engine capable of performing the functions described herein. For example, the compute engine 720 may be embodied as a single or multi-core processor(s), digital signal processor, microcontroller, field-programmable gate array (FPGA), or other configurable circuitry, application-specific integrated circuit (ASIC), or other processor or processing/controlling circuit. Similarly, the memory 724 may be embodied as any type of volatile or non-volatile memory or data storage capable of performing the functions described herein. In operation, the memory 724 may store various data and software used during operation of the edge cloud device 702 such as operating systems, applications, programs, libraries, and drivers. As shown, the memory 724 may be communicatively coupled to the compute engine 720 via the I/O subsystem 722, which may be embodied as circuitry and/or components to facilitate input/output operations with the compute engine 720, the memory 724, and other components of the edge cloud device 702. For example, the I/O subsystem 722 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 724 may be directly coupled to the compute engine 720, for example via an integrated memory controller hub. Additionally, in some embodiments, the I/O subsystem 722 may form a portion of a system-on-a-chip (SoC) and be incorporated, along with the compute engine 720, the memory 724, and/or other components of the edge cloud device 702, on a single integrated circuit chip.

The data storage device 726 may be embodied as any type of device or devices configured for short-term or long-term storage of data such as, for example, memory devices and circuits, memory cards, hard disk drives, solid-state drives, non-volatile flash memory, or other data storage devices. The communications subsystem 728 may be embodied as any communication circuit, device, or collection thereof, capable of enabling communications between the edge cloud device 702 and other remote devices over the network 706. The communications subsystem 728 may be configured to use any one or more communication technology (e.g., wired or wireless communications) and associated protocols (e.g., Ethernet, Bluetooth®, Wi-Fi®, WiMAX, 3G, 4G LTE, 5G, etc.) to effect such communication.

As shown, the edge cloud device 702 further includes a baseboard management controller (BMC) 730 and one or more platform sensors 734. The BMC 730 may be embodied as any hardware component(s) or circuitry capable of providing manageability and security-related services to the edge cloud device 702. In particular, the BMC 730 may include a microprocessor, microcontroller, management controller, service processor, or other embedded controller capable of executing firmware and/or other code independently and securely from the compute engine 720. For example, the BMC 730 may be embodied as a manageability engine (ME), a converged security and manageability engine (CSME), an Intel® innovation engine (IE), a board management controller (BMC), an embedded controller (EC), or other independent management controller of the edge cloud device 702. The BMC 730 may communicate with the compute engine 720 and/or other components of the edge cloud device 702 over an I/O link such as PCI Express or over a dedicated bus, such as a host embedded controller interface (HECI). The BMC 730 may also be capable of communicating using the communication subsystem 728 or a dedicated communication circuit independently of the state of the edge cloud device 702 (e.g., independently of the state of the main compute engine 720), also known as "out-of-band" communication.

As shown, the BMC 730 may include an accelerator 732. The accelerator 732 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator 732 is an FPGA, which may be embodied as an integrated circuit including programmable digital logic resources that may be configured after manufacture. The FPGA may include, for example, a configurable array of logic blocks in communication over a configurable data interchange. Although illustrated as being included in the BMC 730, in some embodiments the accelerator 732 may be an independent component or may be incorporated in or otherwise coupled with one or more other components of the edge cloud device 702, such as the compute engine 720 or a network interface controller (NIC) of the communication subsystem 728.

The sensors 734 may be embodied as one or more sensors that may be used to detect a potential physical attack. For example, the sensors 734 may include one or more enclosure open sensors (e.g., contact switches, optical sensors, or other sensors) that may detect when an enclosure of the edge cloud device 702. As another example, the sensors 734 may include accelerometers, gyroscopes, motion sensors, location sensors, or other sensors that may detect when the edge cloud device 702 is physically moved to a new location or otherwise physically disturbed. As another example, the sensors 734 may include digital thermometers or other temperature sensors that measure the temperature of the compute engine 720, the memory 724 modules, or other components of the edge cloud device 702. Temperature sensors may detect potential cold boot attacks in which an attacker attempts to read the contents of volatile memory after platform reset by exposing the memory device (e.g., a DIMM) to cold temperatures.

The edge orchestrator 704 may be embodied as any type of computation or computer device capable of performing the functions described herein, including, without limitation, a switch, a router, a network device, a computer, a mobile computing device, a server, a workstation, a multiprocessor system, a distributed computing device, and/or a consumer electronic device. Additionally or alternatively, the edge orchestrator 704 may be embodied as a one or more compute sleds, memory sleds, or other racks, sleds, computing chassis, or other components of a physically disaggregated computing device. As such, the edge orchestrator 704 may include components and features similar to the edge cloud device 702, such as a compute engine 720, I/O subsystem 722, memory 724, data storage 726, communication subsystem 728, and/or various peripheral devices. Those individual components of the edge orchestrator 704 may be similar to the corresponding components of the edge cloud device 702, the description of which is applicable to the corresponding components of the edge orchestrator 704 and is not repeated for clarity of the present description.

The edge cloud devices 702 and the edge orchestrator 704 may be configured to transmit and receive data with each other and/or other devices of the system 700 over the network 706. The network 706 may be embodied as any number of various wired and/or wireless networks. For example, the network 706 may be embodied as, or otherwise include a mobile access network, a network edge infrastructure, a wired or wireless local area network (LAN), and/or a wired or wireless wide area network (WAN). As such, the network 706 may include any number of additional devices, such as additional base stations, access points, computers, routers, and switches, to facilitate communications among the devices of the system 700. In the illustrative embodiment, the network 706 is embodied as an edge network fabric.

Figure 8:
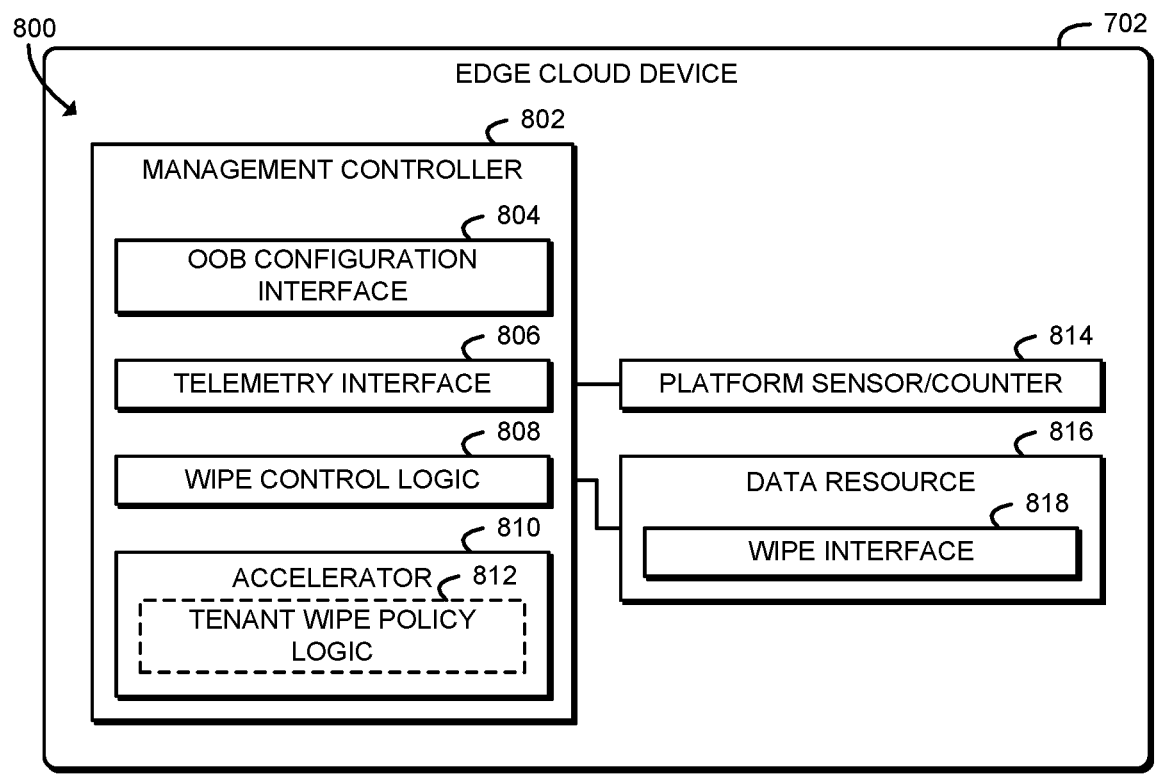
FIG. 8 is a simplified block diagram of at least one embodiment of an environment of an edge cloud device of the system of FIG. 7.

Referring now to FIG. 8, in an illustrative embodiment, the edge cloud device 702 establishes an environment 800 during operation. The illustrative environment 800 includes an out-of-band (OOB) configuration interface 804, a telemetry interface 806, wipe control logic 808, tenant wipe policy logic 812, and a wipe interface 818. The various components of the environment 800 may be embodied as hardware, firmware, software, or a combination thereof. As such, in some embodiments, one or more of the components of the environment 800 may be embodied as circuitry or collection of electrical devices (e.g., OOB configuration interface circuitry 804, telemetry interface circuitry 806, wipe control logic circuitry 808, tenant wipe policy logic circuitry 812, and/or wipe interface circuitry 818). It should be appreciated that, in such embodiments, one or more of the OOB configuration interface circuitry 804, the telemetry interface circuitry 806, the wipe control logic circuitry 808, the tenant wipe policy logic circuitry 812, and/or the wipe interface circuitry 818 may form a portion of the compute engine 720, the I/O subsystem 722, the memory 724, the data storage device 726, the BMC 730, and/or other components of the edge cloud device 702. Additionally, in some embodiments, one or more of the illustrative components may form a portion of another component and/or one or more of the illustrative components may be independent of one another.

As shown, the OOB configuration interface 804, the telemetry interface 806, the wipe control logic 808, and the tenant wipe policy logic 812 may be included in a management controller 802. The management controller 802 may be embodied as the BMC 730 or other management controller of the edge cloud device 702. Similarly, the illustrative tenant wipe policy logic 812 is included in an accelerator 810 of the management controller 802. The accelerator 810 may be embodied as the accelerator 732 of the BMC 730 or other accelerator device of the edge cloud device 702.

As shown, the environment 800 further includes one or more platform sensors/counters 814 and a data resource 816. The platform sensors/counters 814 may be embodied as one or more platform sensors 734 as well as other sensors or counters included in the edge cloud device 702 or included in components of the edge cloud device 702 such as the compute engine 720. The data resource 816 may be embodied as a DIMM or other memory resource (e.g., part or all of the memory 724), a mass storage device or other storage resource (e.g., part or all of the data storage device 726), a cache or buffer included in a component of the edge cloud device 702 such as the compute engine 720 or the I/O subsystem 722, or other data resource of the edge cloud device 702. In some embodiments, the data resource 816 may be a disaggregated data resource coupled to the edge cloud device 702 (e.g., a remote storage sled, memory sled, or other disaggregated resource). As shown, the data resource 816 includes the wipe interface 818.

The telemetry interface 806 is configured to receive telemetry data indicative of the potential presence of a physical attack. The telemetry data is associated with a tenant of the edge cloud device 702. The telemetry data may be embodied as sensor data received from one or more platform sensors or counters 814, such as cabinet open sensor data, motion sensor data, or temperature sensor data. The telemetry data may be selected from one or more sensors or counters 814 associated with the tenant.

The wipe control logic 808 is configured to determine whether a physical attack condition is present based on the telemetry data. In some embodiments, the wipe control logic 808 may be configured to store one or more predetermined telemetry thresholds associated with each tenant and to determine whether the physical attack condition is present by comparing the telemetry data to the one or more predetermined telemetry thresholds. In some embodiments, the wipe control logic 808 may be further configured to configure the accelerator 810 with a wipe policy logic 812 associated with the tenant (e.g., program the accelerator 810 with bitstream) and to provide the telemetry data to the wipe policy logic 812. The wipe control logic 808 is further configured to instruct the data resource 816 to wipe a tenant data range in response to determining that the physical attack condition is present. The tenant data range is associated with the tenant. The wipe control logic 808 may be further configured to notify an operator in response to wiping the data resource 816.

The tenant wipe policy logic 812 is configured to determine whether the physical attack condition is present based on the telemetry data provided by the management controller 802. The tenant wipe policy logic 812 may be embodied as an accelerator functional unit (AFU) or other component of the accelerator 810. Thus, the particular algorithm or policy used to determine whether the attack condition is present may vary by tenant.

The OOB configuration interface 804 is configured to establish an OOB interface to configure the determination of whether a physical attack condition is present. For example, the edge orchestrator 704 or other orchestration entity may configure the edge cloud device 702 by specifying the telemetry sources, telemetry thresholds, tenant data ranges, wipe policy logic 812, and/or other configuration parameters for each tenant of the edge cloud device 702.

The wipe interface 818 is configured to wipe the tenant data range in response to an instruction to the data resource 816 from the wipe control logic 808. The wipe interface 818 may first determine whether the supplied tenant data range is associated with the tenant. In some embodiments, the wipe interface 818 may wipe all tenant data associated with a particular tenant in the data resource 816.

Figure 9:
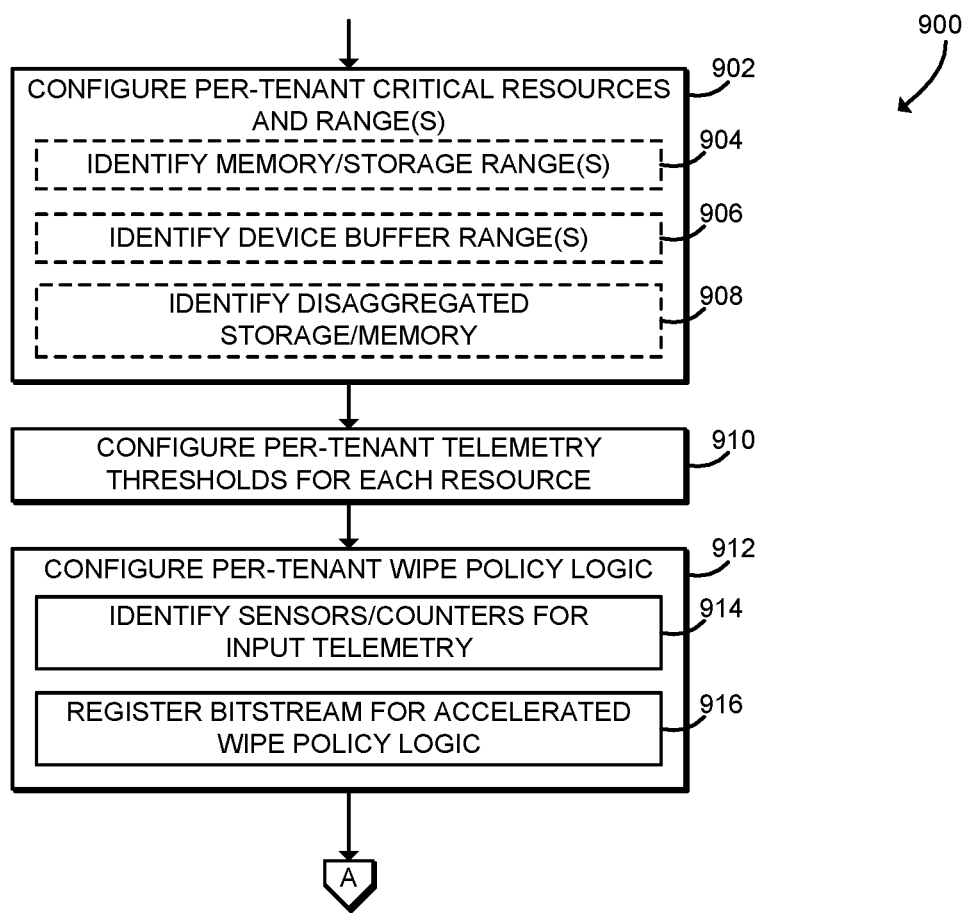
FIGS. 9 and 10 are a simplified flow diagram of at least one embodiment of a method for physical data security that may be executed by an edge cloud device of the system of FIGS. 7-8.
Figure 10:
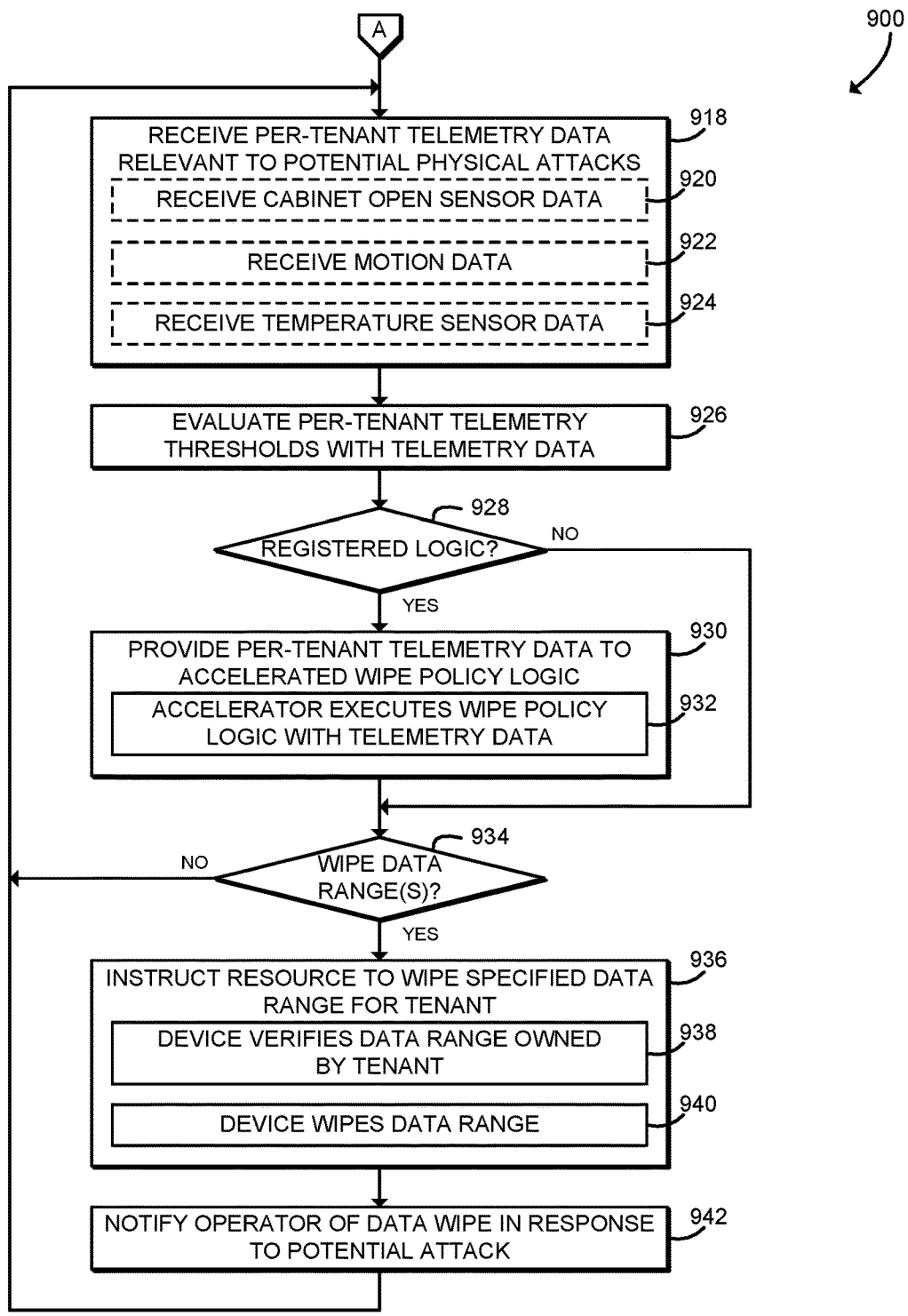

Referring now to FIGS. 9 and 10, in use, the edge cloud device 702 may execute a method 900 for physical data security. It should be appreciated that, in some embodiments, the operations of the method 900 may be performed by one or more components of the environment 800 of the edge cloud device 702 as shown in FIG. 8, such as the management controller 802 and/or the data resource 816. The method 900 begins in block 902, in which the BMC 730 of the edge cloud device 702 configures per-tenant critical resources and associated ranges. The critical resources and ranges may contain tenant data or other sensitive data that should be securely wiped in the event of a potential physical attack. The resources and ranges may be stored in a configuration table, registers, or other logic of the edge cloud device 702. The edge cloud device 702 may be configured by the edge orchestrator 704, for example via one or more management interfaces. In some embodiments, in block 904 the edge cloud device 702 may identify one or more memory and/or storage ranges associated with the tenant. The memory and/or storage ranges may identify locations of tenant data within the memory 724, the data storage device 726, or other memory or storage devices of the edge cloud device 702. In some embodiments, in block 906 the edge cloud device 702 may identify one or more device buffer ranges. The device buffers may include cache or other data buffers of the compute engine 720, I/O subsystem 722, or other devices of the edge cloud device 702. In some embodiments, in block 908 the edge cloud device 702 may identify one or more disaggregated memory or storage ranges. The disaggregated memory and/or storage may be stored in another device, such as another edge cloud device 702 of the edge network 706.

In block 910, the BMC 730 of the edge cloud device 702 configures per-tenant telemetry thresholds for each resource. Each telemetry threshold may correspond to a particular sensor or counter 814 of the edge cloud device 702 and may be used to detect the presence of a potential physical attack. For example, the telemetry thresholds may include minimum temperature, maximum counter value, or other threshold. The thresholds may be configured by an edge orchestrator 704, for example via one or more management interfaces.

In block 912, the BMC 730 of the edge cloud device 702 configures per-tenant wipe policy logic 812. As described further below, the wipe policy logic 812 may analyze the telemetry data and determine whether a potential physical attack condition is present. In some embodiments, the wipe policy logic 812 may also identify particular memory or storage ranges, buffers, or other locations for wiping. For example, the wipe policy logic 812 may determine to wipe certain locations that include highly sensitive data (e.g., user private information) in particular circumstances (e.g., potential cabinet open detected), and may determine to wipe all tenant data in other circumstances (e.g., potential cold boot attack or other memory tampering). The wipe policy logic 812 may execute any algorithm or policy provided by the tenant for making that determination. In block 914, the edge cloud device 702 identifies the platform sensors/counters 814 to be input as telemetry to the wipe policy logic 812. Thus, each tenant may determine whether to wipe tenant data based on a different group of input sensors. In block 916, the edge cloud device 702 registers bitstream for accelerated wipe policy logic 812. The edge cloud device 702 may, for example, program the bitstream to an FPGA or otherwise prepare for accelerated execution of the wipe policy logic 812. After configuring the per-tenant wipe policy logic 812, the method 900 advances to block 918, shown in FIG. 10.

Referring now to FIG. 10, in block 918 the BMC 730 of the edge cloud device 702 receives per-tenant telemetry data that is relevant to potential physical attacks on the edge cloud device 702. The telemetry data may be received from one or more platform sensors 734, platform counters, or other data sources of the edge cloud device 702. In some embodiments, the BMC 730 may also collect the platform telemetry for other purposes (e.g., performance monitoring and management), for example via an Intelligent Platform Management Interface (IPMI). The BMC 730 may receive or select telemetry data from certain platform sensors 734 or counters based on each tenant. As described above, the sensors for each tenant may be configured using a management interface of the BMC 730.

In some embodiments, in block 920 the edge cloud device 702 may receive cabinet open sensor data. The cabinet open sensor data may include contact switch sensor data, proximity sensor data, infrared beam sensor data, or other sensor data that may indicate that a cabinet or other physical enclosure of the edge cloud device 702 is being opened or otherwise physically tampered with. In some embodiments, in block 922 the edge cloud device 702 may receive motion data, for example from an accelerometer, gyroscope, or other motions sensor of the edge cloud device 702. The motion sensor data may indicate that the edge cloud device 702 has been physically moved from its ordinary location, which may indicate a physical attack. In some embodiments, the motion data may include GPS data or other location data that also indicates whether the edge cloud device 702 has been moved. In some embodiments, in block 924 the edge cloud device 702 may receive temperature sensor data, for example from digital thermometers included in the edge cloud device 702 or in various components of the edge cloud device 702 (e.g., the compute engine 720 or the memory 724). A low temperature (e.g., below freezing, about 28° F./−2° C., or colder) may indicate the presence of a cold boot attack. In a cold boot attack, an attacker may bring the memory 724 or other components of the edge cloud device 702 that include volatile data to a low temperature and then cut the power to or otherwise halt the edge cloud device 702. Removing the power supply from volatile memory typically causes the contents of the volatile memory to be lost in a short amount of time; however, bringing the volatile memory components to low temperatures may extend the time that the contents of volatile memory remain valid. The attacker attempts to read the contents of the memory 724 before the volatile data is lost, for example by booting the edge cloud device 702 into a malicious firmware environment or by removing and analyzing memory chips or other physical components.

In block 926, the BMC 730 of the edge cloud device 702 evaluates one or more per-tenant telemetry thresholds against the telemetry data. The thresholds indicate the presence of a potential physical attack. For example, the BMC 730 may determine whether measured temperature is below a particular threshold temperature (e.g., 28° F. or −2° C.). The thresholds may be stored in a table or other storage of the BMC 730, and each tenant may define particular thresholds for each sensor 734 or counter. As described above, the thresholds may be received via a management interface.

In block 928, the BMC 730 of the edge cloud device 702 determines whether a wipe policy logic 812 has been registered for the tenant. If not, the method 900 branches ahead to block 934, described below. If a wipe policy logic 812 has been registered, the method 900 advances to block 930.

In block 930, the BMC 730 of the edge cloud device 702 provides the per-tenant telemetry data to the accelerated wipe policy logic 812. The BMC 730 may, for example, provide the data to an accelerator functional unit (AFU) or other component of the accelerator 732. As described above, each tenant may register a particular wipe policy logic 812. In block 932, the accelerator 732 of the edge cloud device 702 executes or otherwise evaluates the wipe policy logic 812 with the per-tenant telemetry data. The wipe policy logic 812 may execute any algorithm or evaluate any policy provided by the tenant for determining whether a physical attack is potentially occurring. The accelerator 732 may assert a signal or otherwise return a result indicating whether a potential physical attack has been detected.

In block 934, the BMC 730 of the edge cloud device 702 determines whether to wipe one or more tenant data ranges. The BMC 730 may, for example, determine whether any telemetry threshold has been exceeded or if the accelerated wipe policy logic 812 has detected a potential physical attack. If the BMC 730 determines not to wipe tenant data ranges, the method 900 loops back to block 918 to continue monitoring telemetry. If the BMC 730 determines to wipe one or more tenant data ranges, the method 900 advances to block 936.

In block 936, the BMC 730 of the edge cloud device 702 instructs a data resource to wipe a specified data range for the tenant. The BMC 730 may, for example, send a command via a high-speed interface to a data resource to wipe the tenant data. The command may identify the tenant, for example by including a tenant ID, and may identify the data range to be wiped. In some embodiments, the command may request wiping all of the data associated with a tenant, for example by including a tenant identifier with no associated range. The data resource may be embodied as a memory device, a data storage device, a device buffer, or other volatile or nonvolatile data location of the edge cloud device 702. In block 938, the receiving data resource verifies that the specified data range is owned by the specified tenant. The data resource may, for example, compare to the supplied tenant identifier to a table or other configuration data that associates data ranges to tenants. The data ranges and tenant associations may be configured using one or more management interfaces aws described above. If the data range is not owned by the specified tenant, the data resource may generate an error or otherwise abort the wipe request. In block 940, the data resource wipes the specified tenant data range. As described above, the data resource may wipe a range of data specified by the BMC 730 and/or may wipe all data associated with the tenant. The data resource may use any appropriate technique to securely delete the contents of the tenant data. For example, the data resource may overwrite the tenant data with a predetermined data or data pattern, with random data, or otherwise securely remove the tenant data. After being wiped, the tenant data may be inaccessible even to an attacker with physical access to the edge cloud device 702.

In block 942, the BMC 730 of the edge cloud device 702 notifies an operator of the data wipe in response to a potential attack. After receiving the notification, the operator may perform remedial measures, such as taking the edge cloud device 702 offline, physically securing the edge cloud device 702, restoring the edge cloud device 702 from backup, or other remedial measures. After notifying the operator, the method 900 loops back to block 916 to continue monitoring telemetry data.

Figure 11:
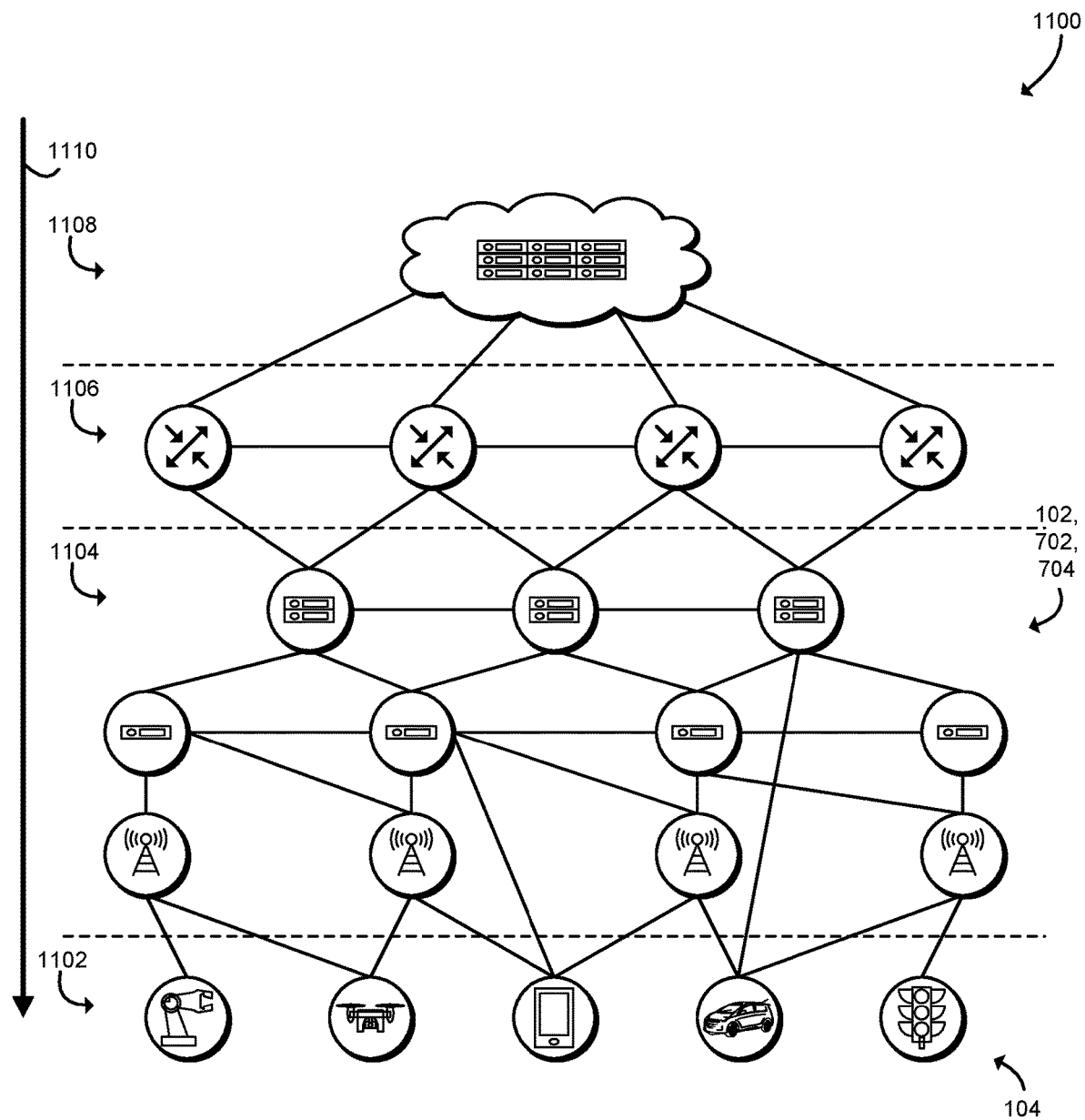
FIG. 11 is a simplified block diagram of at least one embodiment of an edge architecture that may include the systems of FIGS. 1-2 and/or FIGS. 7-8.

Referring now to FIG. 11, diagram 1100 shows an edge architecture that may include the systems 100 and/or 700. As shown, the edge architecture includes multiple tiers 1102, 1104, 1106, 1108. Each tier includes multiple nodes that may communicate via an edge fabric to other nodes of the same tier and/or nodes at other tiers. As shown, the endpoint devices 104 may be included in the things/endpoint tier 1102. The things/endpoint tier 1102 may include large numbers of endpoint devices 104 that are heterogeneous, may be mobile, and are widely distributed geographically. The access/edge tier 1104 may include access network components such as wireless towers, access points, base stations, intermediate nodes, gateways, fog nodes, central offices, and other access network or edge components. Components of the access/edge tier 1104 may be distributed at the building, small cell, neighborhood, or cell scale. Thus, components of the access/edge tier 1104 may be relatively close in physical proximity to components of the things/endpoint tier 1102. The core network tier 1106 may include core network routers, network gateways, servers, and other more-centralized computing devices. Components of the core network tier 1106 may be distributed regionally or nationally. The cloud/Internet tier 1108 may include Internet backbone routers, cloud service providers, datacenters, and other cloud resources. The components of the cloud/Internet tier 1108 may be distributed globally. As shown, the edge cloud devices 102, 702 and the orchestrator 704 may be included in all of the access/edge tier 1104, the core network tier 1106, and/or the cloud/Internet tier 1108.

As shown, the edge architecture is organized according to a logical gradient 1110 from global, cloud-based components toward local, endpoint devices. Components that are closer to the network edge (i.e., closer to the endpoint tier 1102) may be smaller but more numerous, with fewer processing resources and lower power consumption, as compared to components that are closer to the network core (i.e., closer to the cloud/Internet tier 1108). However, network communications among components closer to the network edge may be faster and/or have lower latency as compared to communications that traverse through tiers closer to the network core. The same logical gradient 1110 may apply to components within a tier. For example, the access/edge tier 1104 may include numerous, widely spread base stations, street cabinets, and other access nodes as well as less-numerous but more sophisticated central offices or other aggregation nodes. Thus, by including key caching functionality in the access/edge tier 1104 or other components close to the network edge (e.g., logically close to the endpoint devices 104), the systems 100, 700 may improve latency and performance as compared to traditional cloud-computing based FaaS architectures.

In addition to the mobile edge computing implementation described above, it should be appreciated that the foregoing systems and methods may implemented in any environment (e.g., smart factories, smart cities, smart buildings, and the like) in which the devices are arranged and interoperate in a manner similar to that described with reference to FIGS. 1 and 7, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

EXAMPLES

Illustrative examples of the technologies disclosed herein are provided below. An embodiment of the technologies may include any one or more, and any combination of, the examples described below.

Example 1 includes a computing device for edge data access, the computing device comprising tenant application logic to generate an access request from a service executed by the computing device to a virtual address; an address decoder to (i) translate the virtual address to an edge location address based on an edge translation table associated with the service, and (ii) determine whether the edge location address is local to the computing device in response to translation of the virtual address; a table updater to determine whether the access request is a modification request in response to a determination that the edge location is not local to the computing device; a remote access interface to perform the access request with a remote resource in response to a determination that the access request is not a modification request; and a local access interface to perform the access request with a local resource of the computing device in response to a determination that the access request is a modification request; wherein the table updater is further to update the edge translation table based on the local resource of the computing device in response to performance of the access request with the local resource.

Example 2 includes the subject matter of Example 1, and wherein the local access interface is further to perform the access request with a local resource of the computing device in response to a determination that the edge location address is local to the computing device.

Example 3 includes the subject matter of any of Examples 1 and 2, and further including migration logic to determine whether to localize the access request in response to the determination that the access request is not a modification request; copy data from the remote resource to a local resource of the computing device in response to a determination to localize the access request; and update the edge translation table based on the local resource of the computing device in response to copying of the data from the remote resource.

Example 4 includes the subject matter of any of Examples 1-3, and wherein to determine whether to localize the access request comprises to determine whether to localize the access request based on an edge topography of the remote resource.

Example 5 includes the subject matter of any of Examples 1-4, and wherein to determine whether to localize the access request comprises to determine whether to localize the access request based on a policy associated with the service.

Example 6 includes the subject matter of any of Examples 1-5, and further including a hardware accelerator, wherein to determine whether to localize the access request comprises to determine whether to localize the access request by the hardware accelerator.

Example 7 includes the subject matter of any of Examples 1-6, and further including migration logic to determine whether to migrate the service to a remote computing device; notify an edge device associated with the service in response to a determination to migrate the service; hibernate the service in response to a determination to migrate the service; send the edge translation table to the remote computing device in response to hibernation of the service; and migrate the service to the remote computing device in response to sending of the edge translation table.

Example 8 includes the subject matter of any of Examples 1-7, and wherein to migrate the service comprises to send a service identifier and an edge device identifier to the remote computing device; and request the remote computing device to resume the service.

Example 9 includes the subject matter of any of Examples 1-8, and wherein to determine whether to migrate the service comprises to monitor telemetry of a connection between the edge device and the computing device; and determine whether to migrate the service based on the telemetry.

Example 10 includes the subject matter of any of Examples 1-9, and wherein to determine whether to migrate the service comprises to determine whether to migrate the service based on a hint received from a central office.

Example 11 includes the subject matter of any of Examples 1-10, and wherein to determine whether to migrate the service comprises to determine to migrate the service in response to receipt of a request to migrate the service from the edge device.

Example 12 includes the subject matter of any of Examples 1-11, and wherein to determine whether to migrate the service comprises to determine whether to migrate the service based on a priority associated with the service or a deadline associated with migrating the service.

Example 13 includes the subject matter of any of Examples 1-12, and further including a hardware accelerator, wherein to determine whether to migrate the service comprises to determine whether to migrate the service by the hardware accelerator.

Example 14 includes the subject matter of any of Examples 1-13, and wherein the hardware accelerator comprises a field-programmable gate array (FPGA).

Example 15 includes the subject matter of any of Examples 1-14, and wherein the virtual address of the access request identifies a memory location or a data storage location.

Example 16 includes a computing device for edge data access, the computing device comprising migration logic to receive an edge translation table from a remote computing device, wherein the edge translation table is indicative of a plurality of mappings, wherein each mapping is from a virtual address to an edge location address, and wherein each edge location address is indicative of a local resource of the computing device or a remote resource; migrate a service from the remote computing device; and resume the service in response to migration of the service, wherein the service is associated with the edge translation table.

Example 17 includes the subject matter of Example 16, and wherein the migration logic is further to instantiate the edge translation table in an address decoder of the computing device; and to resume the service comprises to resume the service in response to instantiation of the edge translation table.

Example 18 includes the subject matter of any of Examples 16 and 17, and wherein to migrate the service comprises to receive a service identifier and an edge device identifier from the remote computing device; and receive a request from the remote computing device to resume the service.

Example 19 includes the subject matter of any of Examples 16-18, and wherein the migration logic is further to send a notification to an edge device associated with the service in response to resumption of the service.

Example 20 includes the subject matter of any of Examples 16-19, and further including a hardware accelerator, wherein the hardware accelerator comprises the migration logic.

Example 21 includes a computing device for secure data management, the computing device comprising a data resource; and a management controller to (i) receive telemetry data indicative of presence of a physical attack, wherein the telemetry data is associated with a tenant of the computing device, (ii) determine whether a physical attack condition is present based on the telemetry data, and (iii) instruct the data resource to wipe a tenant data range in response to a determination that the physical attack condition is present, wherein the tenant data range is associated with the tenant; wherein the data resource is to wipe the tenant data range in response to an instruction to the data resource.

Example 22 includes the subject matter of Example 21, and wherein the management controller further comprises an accelerator; the management controller is to configure the accelerator with a wipe policy logic associated with the tenant; and to determine whether the physical attack condition is present comprises to (i) provide the telemetry data to the wipe policy logic of the accelerator in response to configuration of the accelerator, and (ii) determine, by the wipe policy logic of the accelerator, whether the physical attack condition is present.

Example 23 includes the subject matter of any of Examples 21 and 22, and wherein the accelerator comprises a field-programmable gate array, and wherein to configure the accelerator comprises to program the accelerator with bitstream corresponding to the wipe policy logic.

Example 24 includes the subject matter of any of Examples 21-23, and wherein the management controller is further to store one or more predetermined telemetry thresholds associated with the tenant; and to determine whether the physical attack condition is present comprises to compare the telemetry data to the one or more predetermined telemetry thresholds.

Example 25 includes the subject matter of any of Examples 21-24, and wherein the telemetry data comprises cabinet open sensor data, motion sensor data, or temperature sensor data.

Example 26 includes the subject matter of any of Examples 21-25, and wherein to receive the telemetry data comprises to select the telemetry data from one or more sensors or counters associated with the tenant.

Example 27 includes the subject matter of any of Examples 21-26, and wherein the data resource comprises a memory device, a data storage device, or a device buffer of the computing device.

Example 28 includes the subject matter of any of Examples 21-27, and wherein the data resource comprises a disaggregated memory device or a disaggregated storage device coupled to the computing device.

Example 29 includes the subject matter of any of Examples 21-28, and wherein to wipe the tenant data range in response to the instruction to the data resource comprises to determine whether the tenant data range is associated with the tenant; and wipe the tenant data range in response to a determination that the tenant data range is associated with the tenant.

Example 30 includes the subject matter of any of Examples 21-29, and wherein to wipe the tenant data range comprises to wipe all tenant data associated with the tenant in the data resource.

Example 31 includes the subject matter of any of Examples 21-30, and wherein the management controller is further to notify an operator in response to wiping of the data resource.

Example 32 includes the subject matter of any of Examples 21-31, and wherein the management controller is further to establish an out of band interface to configure the determination of whether a physical attack condition is present based on the telemetry data and to configure one or more sensors or counters for the telemetry data.

Example 33 includes a method for edge data access, the method comprising generating, by a computing device, an access request from a service executed by the computing device to a virtual address; translating, by the computing device, the virtual address to an edge location address based on an edge translation table associated with the service; determining, by the computing device, whether the edge location address is local to the computing device in response to translating the virtual address; determining, by the computing device, whether the access request is a modification request in response to determining that the edge location is not local to the computing device; performing, by the computing device, the access request with a remote resource in response to determining that the access request is not a modification request; performing, by the computing device, the access request with a local resource of the computing device in response to determining that the access request is a modification request; and updating, by the computing device, the edge translation table based on the local resource of the computing device in response to performing the access request with the local resource.

Example 34 includes the subject matter of Example 33, and further including performing, by the computing device, the access request with a local resource of the computing device in response to determining that the edge location address is local to the computing device.

Example 35 includes the subject matter of any of Examples 33 and 34, and further including determining, by the computing device, whether to localize the access request in response to determining that the access request is not a modification request; copying, by the computing device, data from the remote resource to a local resource of the computing device in response to determining to localize the access request; and updating, by the computing device, the edge translation table based on the local resource of the computing device in response to copying the data from the remote resource.

Example 36 includes the subject matter of any of Examples 33-35, and wherein determining whether to localize the access request comprises determining whether to localize the access request based on an edge topography of the remote resource.

Example 37 includes the subject matter of any of Examples 33-36, and wherein determining whether to localize the access request comprises determining whether to localize the access request based on a policy associated with the service.

Example 38 includes the subject matter of any of Examples 33-37, and wherein determining whether to localize the access request comprises determining whether to localize the access request by a hardware accelerator of the computing device.

Example 39 includes the subject matter of any of Examples 33-38, and further including determining, by the computing device, whether to migrate the service to a remote computing device; notifying, by the computing device, an edge device associated with the service in response to determining to migrate the service; hibernating, by the computing device, the service in response to determining to migrate the service; sending, by the computing device, the edge translation table to the remote computing device in response to hibernating the service; and migrating, by the computing device, the service to the remote computing device in response to sending the edge translation table.

Example 40 includes the subject matter of any of Examples 33-39, and wherein migrating the service comprises sending a service identifier and an edge device identifier to the remote computing device; and requesting the remote computing device to resume the service.

Example 41 includes the subject matter of any of Examples 33-40, and wherein determining whether to migrate the service comprises monitoring telemetry of a connection between the edge device and the computing device; and determining whether to migrate the service based on the telemetry.

Example 42 includes the subject matter of any of Examples 33-41, and wherein determining whether to migrate the service comprises determining whether to migrate the service based on a hint received from a central office.

Example 43 includes the subject matter of any of Examples 33-42, and wherein determining whether to migrate the service comprises determining to migrate the service in response to receiving a request to migrate the service from the edge device.

Example 44 includes the subject matter of any of Examples 33-43, and wherein determining whether to migrate the service comprises determining whether to migrate the service based on a priority associated with the service or a deadline associated with migrating the service.

Example 45 includes the subject matter of any of Examples 33-44, and wherein determining whether to migrate the service comprises determining whether to migrate the service by a hardware accelerator of the computing device.

Example 46 includes the subject matter of any of Examples 33-45, and wherein the hardware accelerator comprises a field-programmable gate array (FPGA).

Example 47 includes the subject matter of any of Examples 33-46, and wherein the virtual address of the access request identifies a memory location or a data storage location.

Example 48 includes a method for edge data access, the method comprising receiving, by a computing device, an edge translation table from a remote computing device, wherein the edge translation table is indicative of a plurality of mappings, wherein each mapping is from a virtual address to an edge location address, and wherein each edge location address is indicative of a local resource of the computing device or a remote resource; migrating, by the computing device, a service from the remote computing device; and resuming, by the computing device, the service in response to migrating the service, wherein the service is associated with the edge translation table.

Example 49 includes the subject matter of Example 48, and further including instantiating, by the computing device, the edge translation table in a virtual edge storage controller of the computing device; wherein resuming the service comprises resuming the service in response to instantiating the edge translation table.

Example 50 includes the subject matter of any of Examples 48 and 49, and wherein migrating the service comprises receiving, by the computing device, a service identifier and an edge device identifier from the remote computing device; and receiving, by the computing device, a request from the remote computing device to resume the service.

Example 51 includes the subject matter of any of Examples 48-50, and further including sending, by the computing device, a notification to an edge device associated with the service in response to resuming the service.

Example 52 includes the subject matter of any of Examples 48-51, and wherein receiving the edge translation table comprises receiving the edge translation table by a hardware accelerator of the computing device; migrating the service comprises migrating the service by the hardware accelerator; and resuming the service comprises resuming the service by the hardware accelerator.

Example 53 includes a method for secure data management, the method comprising receiving, by a management controller of a computing device, telemetry data indicative of presence of a physical attack, wherein the telemetry data is associated with a tenant of the computing device; determining, by the management controller, whether a physical attack condition is present based on the telemetry data; instructing, by the management controller, a data resource of the computing device to wipe a tenant data range in response to determining that the physical attack condition is present, wherein the tenant data range is associated with the tenant; and wiping, by the data resource, the tenant data range in response to instructing the data resource.

Example 54 includes the subject matter of Example 53, and further including configuring, by the management controller, an accelerator of the computing device with a wipe policy logic associated with the tenant; wherein determining whether the physical attack condition is present comprises (i) providing the telemetry data to the wipe policy logic of the accelerator in response to configuring the accelerator and (ii) determining, by the wipe policy logic of the accelerator, whether the physical attack condition is present.

Example 55 includes the subject matter of any of Examples 53 and 54, and wherein the accelerator comprises a field-programmable gate array, and wherein configuring the accelerator comprises programming the accelerator with bitstream corresponding to the wipe policy logic.

Example 56 includes the subject matter of any of Examples 53-55, and further including storing, by the management controller, one or more predetermined telemetry thresholds associated with the tenant; wherein determining whether the physical attack condition is present comprises comparing the telemetry data to the one or more predetermined telemetry thresholds.

Example 57 includes the subject matter of any of Examples 53-56, and wherein the telemetry data comprises cabinet open sensor data, motion sensor data, or temperature sensor data.

Example 58 includes the subject matter of any of Examples 53-57, and wherein receiving the telemetry data comprises selecting the telemetry data from one or more sensors or counters associated with the tenant.

Example 59 includes the subject matter of any of Examples 53-58, and wherein the data resource comprises a memory device, a data storage device, or a device buffer of the computing device.

Example 60 includes the subject matter of any of Examples 53-59, and wherein the data resource comprises a disaggregated memory device or a disaggregated storage device coupled to the computing device.

Example 61 includes the subject matter of any of Examples 53-60, and wherein wiping the tenant data range in response to instructing the data resource comprises determining, by the data resource, whether the tenant data range is associated with the tenant; and wiping, by the data resource, the tenant data range in response to determining that the tenant data range is associated with the tenant.

Example 62 includes the subject matter of any of Examples 53-61, and wherein wiping the tenant data range comprises wiping all tenant data associated with the tenant in the data resource.

Example 63 includes the subject matter of any of Examples 53-62, and further including notifying, by the management controller, an operator in response to wiping the data resource.

Example 64 includes the subject matter of any of Examples 53-63, and further including establishing, by the management controller, an out of band interface to configure determining whether a physical attack condition is present based on the telemetry data and to configure one or more sensors or counters for the telemetry data.

Example 65 includes a computing device comprising a processor; and a memory having stored therein a plurality of instructions that when executed by the processor cause the computing device to perform the method of any of Examples 13-22.

Example 66 includes one or more non-transitory, computer readable storage media comprising a plurality of instructions stored thereon that in response to being executed result in a computing device performing the method of any of Examples 13-22.

Example 67 includes a computing device comprising means for performing the method of any of Examples 13-22.

The invention claimed is:

1. A compute device comprising:
a data resource; and
management controller circuitry to:
determine, for a first tenant and a second tenant of the compute device, whether a potential physical attack condition is present based on first telemetry data associated with the first tenant and second telemetry data associated with the second tenant; and
instruct the data resource of the compute device to wipe a data range associated with at least one of the first tenant or the second tenant for which a determination that the potential physical attack condition is present was made;
the data resource to wipe the data range in response to an instruction from the management controller circuitry.

2. The compute device of claim 1, wherein the management controller circuitry includes accelerator circuitry, and the management controller circuitry is to:
configure the accelerator circuitry with first wipe policy logic for the first tenant and second wipe policy logic for the second tenant;
provide the first telemetry data to the first wipe policy logic and the second telemetry data to the second wipe policy logic in response to configuration of the accelerator circuitry; and
determine, with the first wipe policy logic and the second wipe policy logic, whether the potential physical attack condition is present for the first tenant and the second tenant, respectively.

3. The compute device of claim 1, wherein the management controller circuitry is to:
cause storage of one or more first predetermined telemetry thresholds associated with the first tenant and one or more second predetermined telemetry thresholds associated with the second tenant; and
compare the first telemetry data to the one or more first predetermined telemetry thresholds and the second telemetry data to the one or more second predetermined telemetry thresholds to determine whether the potential physical attack condition is present for the first tenant and the second tenant, respectively.

4. The compute device of claim 1, wherein the first telemetry data includes at least one of cabinet open sensor data, motion sensor data, or temperature sensor data.

5. The compute device of claim 1, wherein the management controller circuitry is to select the first telemetry data from one or more sensors associated with the first tenant or one or more counters associated with the first tenant.

6. The compute device of claim 1, wherein the data resource includes at least one of a memory device, a data storage device, or a device buffer.

7. The compute device of claim 1, wherein the determination is a first determination, the data range is a first data range, and:
the management controller circuitry is to determine, based on the first telemetry data and the second telemetry data, that the potential physical attack condition is present for the first tenant and not present for the second tenant, respectively; and
the data resource is to:
determine whether the data range is associated with the first tenant or the second tenant; and
wipe the data range in response to a second determination that the data range is associated with the first tenant.

8. The compute device of claim 1, wherein the management controller circuitry is to establish an out of band interface to (1) configure the determination, for the first tenant and the second tenant, of whether the potential physical attack condition is present based on the first telemetry data and the second telemetry data, respectively, and (2) configure (a) one or more first sensors or one or more first counters for the first telemetry data and (b) one or more second sensor or one or more second counters for the second telemetry data.

9. One or more storage devices or storage disks comprising instructions to cause a compute device to:
   determine, for a first tenant and a second tenant of the compute device, whether a potential physical attack condition is present based on first telemetry data associated with the first tenant and second telemetry data associated with the second tenant; and
   instruct a data resource of the compute device to wipe a data range associated with at least one of the first tenant or the second tenant for which a determination that the potential physical attack condition is present was made.

10. The one or more storage devices or storage disks of claim 9, wherein the instructions cause the compute device to:
   configure accelerator circuitry of the compute device with first wipe policy logic for the first tenant and second wipe policy logic for the second tenant; and
   cause the first wipe policy logic and the second wipe policy logic to determine whether the potential physical attack condition is present for the first tenant and the second tenant, respectively, by providing the first telemetry data to the first wipe policy logic and the second telemetry data to the second wipe policy logic in response to configuring the accelerator circuitry.

11. The one or more storage devices or storage disks of claim 9, wherein the instructions cause the compute device to:
   cause storage of one or more first predetermined telemetry thresholds associated with the first tenant and one or more second predetermined telemetry thresholds associated with the second tenant; and
   compare the first telemetry data to the one or more first predetermined telemetry thresholds and the second telemetry data to the one or more second predetermined telemetry thresholds to determine whether the potential physical attack condition is present for the first tenant and the second tenant, respectively.

12. The one or more storage devices or storage disks of claim 9, wherein the first telemetry data includes at least one of cabinet open sensor data, motion sensor data, or temperature sensor data.

13. The one or more storage devices or storage disks of claim 9, wherein the instructions cause the compute device to select the first telemetry data from one or more sensors associated with the first tenant or one or more counters associated with the first tenant.

14. The one or more storage devices or storage disks of claim 9, wherein the data resource includes at least one of a memory device, a data storage device, or a device buffer.

15. The one or more storage devices or storage disks of claim 9, wherein to cause the data resource to wipe the data range, the instructions cause the compute device to instruct the data resource to securely delete tenant data stored in the data range by at least one of overwriting the tenant data with one or more of predetermined data, a predetermined data pattern, or random data.

16. A method comprising:
   for a first tenant and a second tenant of a compute device, determining, by executing an instruction with at least one processor of the compute device, whether a potential physical attack condition is present based on first telemetry data associated with the first tenant and second telemetry data associated with the second tenant;
   instructing, by executing an instruction with the processor, a data resource of the compute device to wipe a data range associated with at least one of the first tenant or the second tenant for which a determination that the potential physical attack condition is present was made; and
   wiping, with the data resource, the data range in response to an instruction from the processor.

17. The method of claim 16, including:
   configuring accelerator circuitry of the compute device with first wipe policy logic for the first tenant and second wipe policy logic for the second tenant;
   providing the first telemetry data to the first wipe policy logic and the second telemetry data to the second wipe policy logic in response to configuration of the accelerator circuitry; and
   determining, with the first wipe policy logic and the second wipe policy logic, whether the potential physical attack condition is present for the first tenant and the second tenant, respectively.

18. The method of claim 16, including:
   storing one or more first predetermined telemetry thresholds associated with the first tenant and one or more second predetermined telemetry thresholds associated with the second tenant; and
   determining whether the potential physical attack condition is present for the first tenant and the second tenant by comparing the first telemetry data to the one or more first predetermined telemetry thresholds and the second telemetry data to the one or more second predetermined telemetry thresholds, respectively.

19. The method of claim 16, wherein the first telemetry data includes at least one of cabinet open sensor data, motion sensor data, or temperature sensor data.

20. The method of claim 16, including selecting the first telemetry data from one or more sensors associated with the first tenant or one or more counters associated with the first tenant.

21. The method of claim 16, wherein the data resource includes at least one of a memory device, a data storage device, or a device buffer.

22. The method of claim 16, wherein wiping the data range includes securely deleting tenant data stored in the data range by at least one of overwriting the tenant data with one or more of predetermined data, a predetermined data pattern, or random data.

23. A compute device comprising:
   means for storing data; and
   means for managing to:
      determine, for a first tenant and a second tenant of the compute device, whether a potential physical attack condition is present based on first telemetry data associated with
   the first tenant and second telemetry data associated with the second tenant; and
      instruct the means for storing data of the compute device to wipe a data range associated with at least one of the first tenant or the second tenant for which a determination that the potential physical attack condition is present was made; and
   the means for storing data to wipe the data range in response to an instruction from the means for managing.

24. The compute device of claim 23, further including means for accelerating, and wherein the means for managing is to:
- configure the means for accelerating with a first wipe policy for the first tenant and a second wipe policy for the second tenant;
- provide the first telemetry data and the second telemetry data to the means for accelerating in response to configuration of the means for accelerating; and
- determine, with the first wipe policy and the second wipe policy, whether the potential physical attack condition is present for the first tenant and the second tenant, respectively.

25. The compute device of claim 23, wherein the means for managing is to:
- cause storage of one or more first predetermined telemetry thresholds associated with the first tenant and one or more second predetermined telemetry thresholds associated with the second tenant; and
- compare the first telemetry data to the one or more first predetermined telemetry thresholds and the second telemetry data to the one or more second predetermined telemetry thresholds to determine whether the potential physical attack condition is present for the first tenant and the second tenant, respectively.

26. The compute device of claim 23, wherein the first telemetry data includes at least one of cabinet open sensor data, motion sensor data, or temperature sensor data.

27. The compute device of claim 23, wherein the means for managing is to select the first telemetry data from one or more sensors associated with the first tenant or one or more counters associated with the first tenant.

28. The compute device of claim 23, wherein to wipe the data range, the means for storing data is to securely delete tenant data stored in the data range by at least one of overwriting the tenant data with one or more of predetermined data, a predetermined data pattern, or random data.

29. The compute device of claim 1, wherein to wipe the data range, the data resource is to securely delete tenant data stored in the data range by at least one of overwriting the tenant data with one or more of predetermined data, a predetermined data pattern, or random data.

* * * * *